(12) United States Patent
Hakim et al.

(10) Patent No.: US 12,318,045 B2
(45) Date of Patent: Jun. 3, 2025

(54) TOUCHLESS FOOD DISPENSER

(71) Applicant: TOUCHLESS DISPENSER COMPANY INC., Richmond, VA (US)

(72) Inventors: Bryan Hakim, Cresskill, NJ (US); George Hakim, Aspen, CO (US); Gabe Hakim, Jupiter, FL (US); Christian Haller, Arlington, VA (US)

(73) Assignee: Touchless Dispenser Company, Inc., Richmond, VA (US)

( * ) Notice: Subject to any disclaimer, the term of this patent is extended or adjusted under 35 U.S.C. 154(b) by 0 days.

(21) Appl. No.: 18/421,630

(22) Filed: Jan. 24, 2024

(65) Prior Publication Data

US 2024/0164589 A1 May 23, 2024

Related U.S. Application Data

(63) Continuation of application No. 18/148,596, filed on Dec. 30, 2022, now Pat. No. 11,918,152.

(60) Provisional application No. 63/398,125, filed on Aug. 15, 2022.

(51) Int. Cl.
*A47J 31/40* (2006.01)
*A47J 47/01* (2006.01)
*G05B 19/042* (2006.01)
*G07F 11/62* (2006.01)

(52) U.S. Cl.
CPC .......... *A47J 47/01* (2013.01); *G05B 19/0423* (2013.01); *G07F 11/62* (2013.01); *G05B 2219/23021* (2013.01)

(58) Field of Classification Search
CPC .. B67D 1/0888; B67D 1/0044; B67D 1/0051; B67D 1/0021; B67D 1/0041; B67D 1/005; B67D 1/0085; A47J 47/01; A47J 31/3633; A47J 31/3642; A47J 31/3638;
(Continued)

(56) References Cited

U.S. PATENT DOCUMENTS

| 3,000,408 A | 9/1961 | Vischer, Jr. |
| 3,840,150 A | 10/1974 | Kinney |
| 4,181,162 A | 1/1980 | Newman et al. |

(Continued)

FOREIGN PATENT DOCUMENTS

| WO | 2018085280 A1 | 5/2018 |
| WO | 2021221860 A1 | 11/2021 |

OTHER PUBLICATIONS

Coca Cola "Freestyle' Beverage Dispenser Offers Restaurants Contactless Pouring", Spring Wise, Jul. 30, 2020. [Cited in Parent].
(Continued)

*Primary Examiner* — Charles P. Cheyney
(74) *Attorney, Agent, or Firm* — Michele V. Frank; Venable LLP

(57) ABSTRACT

A touchless food dispenser. The touchless food dispenser includes one or more types of food stored therein, one or more removable nozzles, and one or more nozzle replacement mechanisms. The touchless food dispenser is configured to dispense the food through the one or more removable nozzles. The one or more nozzle replacement mechanisms are configured to remove the one or more removable nozzles and replaces the one or more removable nozzles with a different removable nozzle.

24 Claims, 12 Drawing Sheets

(58) Field of Classification Search
CPC ............... A47J 31/4492; A47J 31/044; G05B 2219/23021; G05B 19/0423; G07F 13/10; G07F 13/065
USPC ...................................................... 222/132
See application file for complete search history.

(56) References Cited

U.S. PATENT DOCUMENTS

| | | | |
|---|---|---|---|
| 4,319,441 A | 3/1982 | Credle | |
| 4,531,342 A | 7/1985 | Wittenborg | |
| 4,828,146 A | 5/1989 | Stein | |
| 4,829,889 A | 5/1989 | Takeuchi et al. | |
| 5,439,136 A * | 8/1995 | Chatani | G07F 11/22 221/270 |
| 5,518,149 A | 5/1996 | Lotspeich et al. | |
| 6,213,343 B1 | 4/2001 | Damikolas | |
| 6,240,832 B1 * | 6/2001 | Schmed | A47J 31/3623 221/121 |
| 6,755,321 B2 | 6/2004 | Solovay et al. | |
| 7,051,646 B2 * | 5/2006 | Della Pietra | A47J 31/3633 99/290 |
| 7,520,247 B2 * | 4/2009 | Rutledge | A01K 5/0275 119/51.01 |
| 7,673,559 B2 * | 3/2010 | Zurcher | A47J 31/4492 99/302 R |
| 8,038,016 B2 * | 10/2011 | Yuyama | G07F 17/0092 221/9 |
| 8,893,922 B2 | 11/2014 | Azzano et al. | |
| 9,189,912 B2 | 11/2015 | Gunderson | |
| 9,327,958 B2 | 5/2016 | Angus et al. | |
| 9,757,309 B2 * | 9/2017 | Okutsu | A61J 7/0076 |
| 9,809,439 B2 | 11/2017 | Falco, III | |
| 10,102,705 B2 * | 10/2018 | Yamamiya | G07F 11/005 |
| 10,252,904 B2 | 4/2019 | Bertness et al. | |
| 10,405,690 B2 * | 9/2019 | Tentorio | A47J 31/4492 |
| 10,947,106 B2 | 3/2021 | Bertness et al. | |
| 11,117,793 B1 | 9/2021 | Khan et al. | |
| 2002/0056721 A1 | 5/2002 | Phillips et al. | |
| 2005/0095158 A1 | 5/2005 | Kirschner et al. | |
| 2006/0261082 A1 * | 11/2006 | Almblad | B65B 69/00 221/260 |
| 2012/0006849 A1 | 1/2012 | Folkmar | |
| 2012/0277906 A1 | 11/2012 | Fassberg et al. | |
| 2013/0153594 A1 | 6/2013 | Yuyama et al. | |
| 2014/0083300 A1 | 3/2014 | Brunner et al. | |
| 2014/0246459 A1 | 9/2014 | Robinson | |
| 2014/0372233 A1 | 12/2014 | Knecht et al. | |
| 2015/0108162 A1 * | 4/2015 | Harter | B65D 75/5805 383/107 |
| 2015/0144653 A1 | 5/2015 | Kline et al. | |
| 2018/0022593 A1 | 1/2018 | Feola | |
| 2018/0072557 A1 * | 3/2018 | Bertness | B01F 33/848 |
| 2019/0300357 A1 | 10/2019 | Crawford et al. | |
| 2020/0122994 A1 | 4/2020 | Cimatti et al. | |
| 2020/0307837 A1 * | 10/2020 | Almblad | B65B 69/0058 |
| 2020/0375214 A1 | 12/2020 | Koehl et al. | |
| 2021/0100396 A1 | 4/2021 | Cohen | |
| 2021/0107724 A1 | 4/2021 | Cohen | |
| 2021/0383084 A1 | 12/2021 | Johnson | |
| 2022/0017347 A1 | 1/2022 | Conway et al. | |
| 2022/0225802 A1 | 7/2022 | Gharibian et al. | |
| 2023/0120468 A1 * | 4/2023 | Coder | G07F 11/005 222/1 |
| 2023/0406689 A1 | 12/2023 | Zubarik | |

OTHER PUBLICATIONS

Server Intelligent by Design "Touchless Express Dispenser" 2020. [Cited in Parent].
U.S. Appl. No. 18/148,555, filed Dec. 30, 2022. [Cited in Parent].
Office Action from U.S. Appl. No. 18/148,555 dated Mar. 31, 2023. [Cited in Parent].
Office Action from U.S. Appl. No. 18/148,555 dated Jul. 18, 2023. [Cited in Parent].
Notice of Allowance from U.S. Appl. No. 18/148,555 dated Aug. 30, 2023. [Cited in Parent].

* cited by examiner

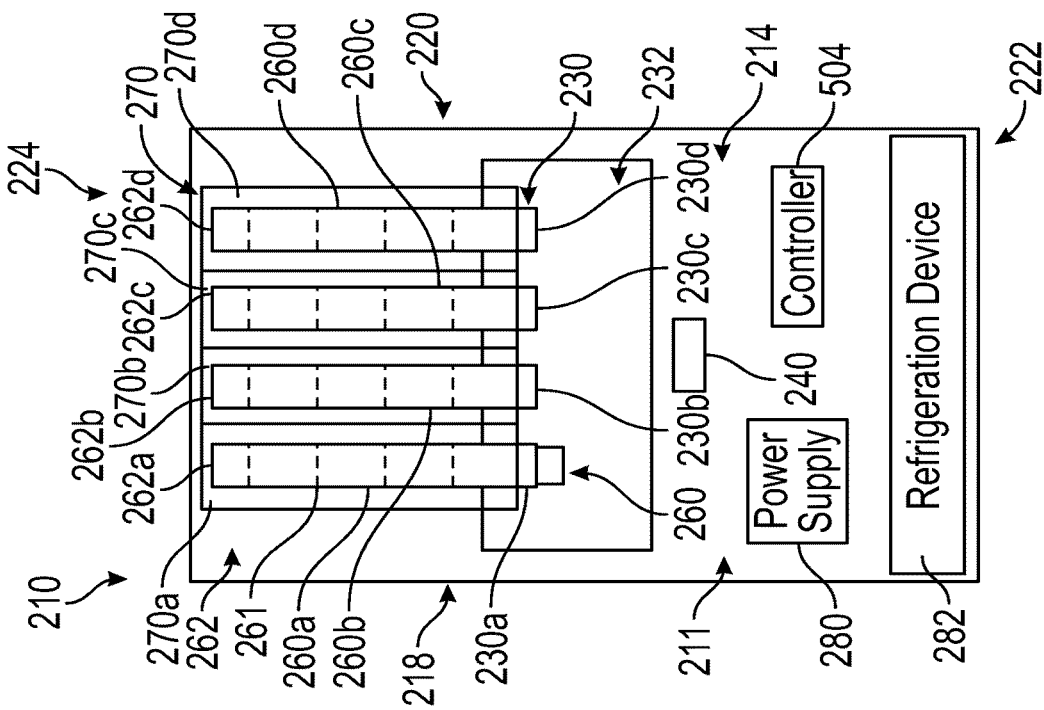
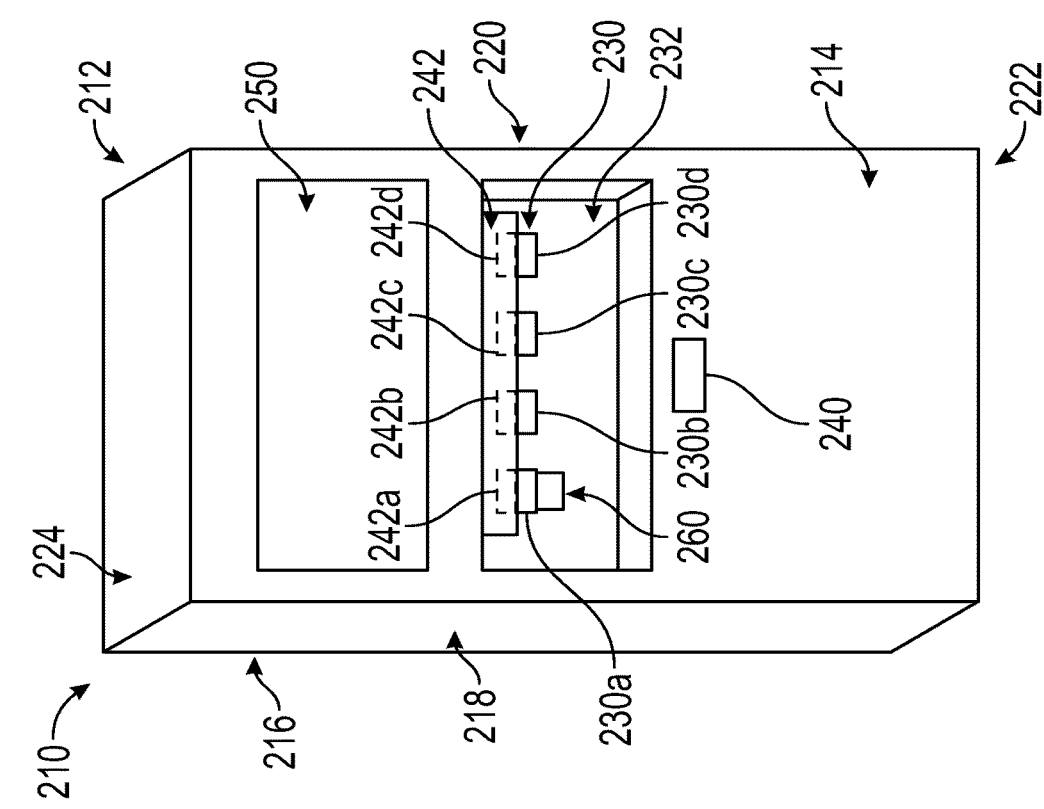

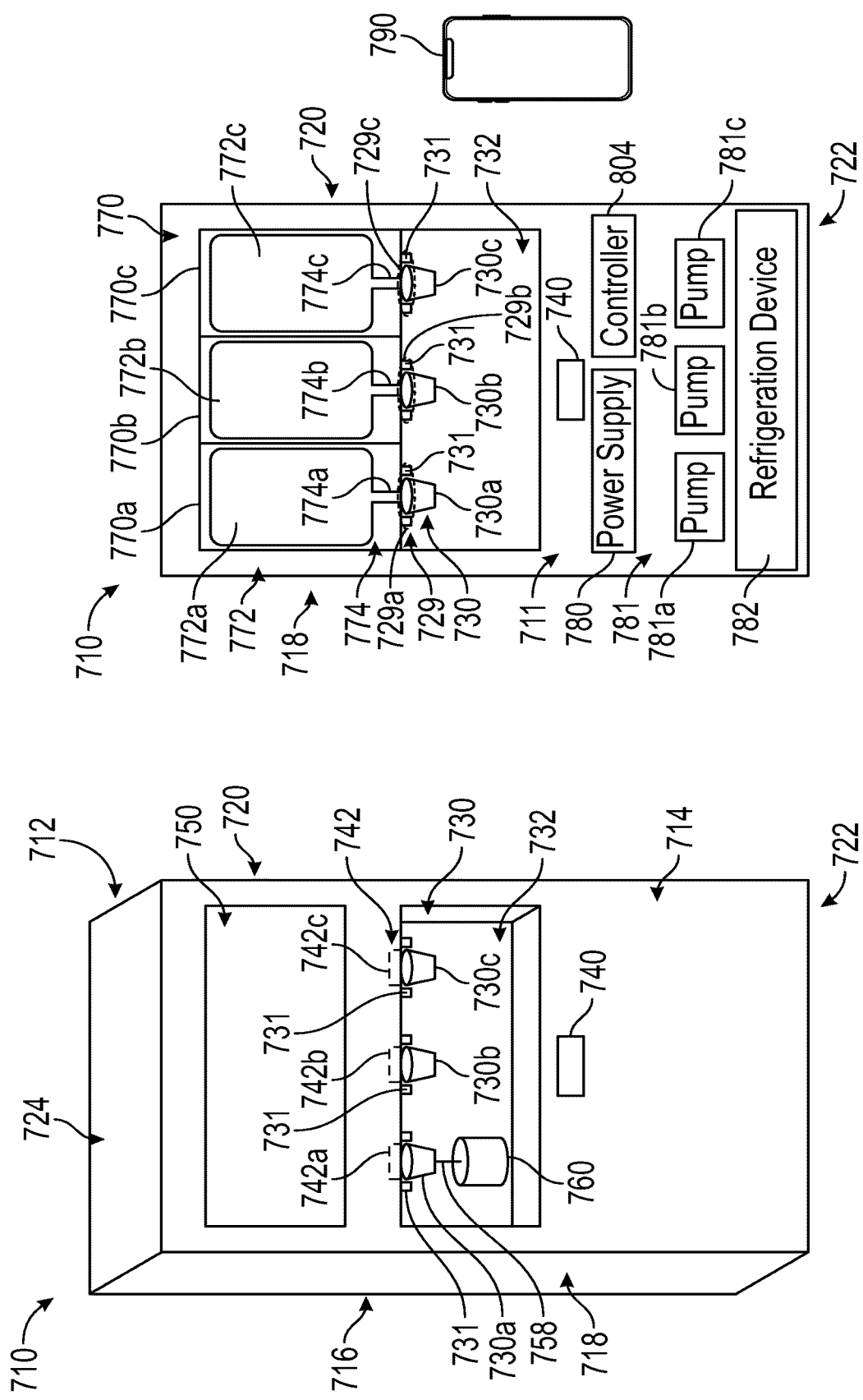

TOUCHLESS FOOD DISPENSER

CROSS REFERENCE TO RELATED APPLICATIONS

This application is a continuation of U.S. patent application Ser. No. 18/148,596 filed Dec. 30, 2022, which claims priority to U.S. Provisional Patent Application No. 63/398,125, filed Aug. 15, 2022, the entire contents of which are hereby incorporated by reference in their entirety. The present application is related to co-pending U.S. patent application Ser. No. 18/148,555, filed Dec. 30, 2022, the entire content of which is hereby incorporated by reference in its entirety.

TECHNICAL FIELD

The present disclosure relates to a touchless food dispenser.

BACKGROUND

Food, such as, condiments, spices, etc., is provided by many different types of food vendors, such as restaurants, concessions, food courts, food trucks, etc. Such food can be provided in packets (e.g., packets of condiments, packets of spices, etc.), and/or can be provided in a dispenser such that the food is dispensed from the dispenser.

BRIEF SUMMARY

According to an embodiment, a touchless food dispenser includes one or more types of food stored therein, one or more removable nozzles, wherein the touchless food dispenser is configured to dispense the food through the one or more removable nozzles, and one or more nozzle replacement mechanisms that are configured to remove the one or more removable nozzles and replace the one or more removable nozzles with a different removable nozzle.

According to an embodiment, a method of dispensing food from a touchless food dispenser includes receiving a selected type of food to dispense from a touchless food dispenser, the touchless food dispenser storing one or more types of food therein, dispensing the selected type of food through one or more removable nozzles from the touchless food dispenser with, and removing, with one or more nozzle replacement mechanisms, the one or more removable nozzles and replacing, with the one or more nozzle replacement mechanisms, the one or more removable nozzles with a different removable nozzle.

According to an embodiment, a touchless food dispenser control system includes a touchless food dispenser comprising one or more types of food stored therein and one or more removable nozzles and a controller configured to control the touchless food dispenser to dispense the food through the one or more removable nozzles, and to remove, with one or more nozzle replacement mechanisms, the one or more removable nozzles and replace, with the one or more nozzle replacement mechanisms, the one or more removable nozzles with a different removable nozzle.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 2A illustrates a schematic, front perspective view of a touchless food dispenser, according to another embodiment of the present disclosure.

FIG. 2B illustrates a schematic, front cutaway view of the touchless food dispenser of FIG. 2A, according to the present disclosure.

FIG. 7A illustrates a schematic, front perspective view of a touchless food dispenser, according to another embodiment of the present disclosure.

FIG. 7B illustrates a schematic, front cutaway view of the touchless food dispenser of FIG. 7A, according to the present disclosure.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first," "second," "third," "fourth," etc., may be used interchangeably to distinguish one component from another and are not intended to signify location or importance of the individual components.

Figure 1:
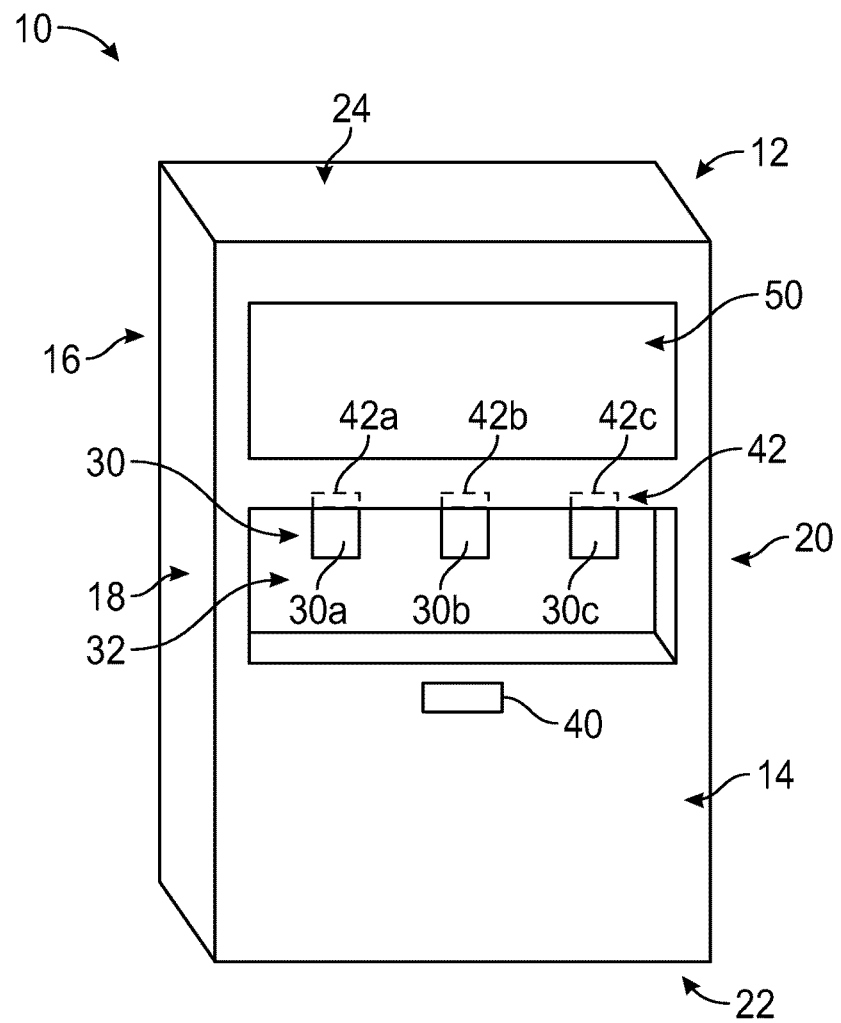
FIG. 1 illustrates a schematic, front perspective view of a touchless food dispenser, according to an embodiment of the present disclosure.

The terms "front," "rear," "top," "bottom," "right side," and "left side" refer to relative positions of the touchless food dispenser based on the orientation shown in FIGS. 1, 2A, and 5A.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

As used herein, "automated" or "automatic," or the like, are used to describe functions that are done without user intervention (e.g., by a controller).

As used herein, "touchless" refers to an apparatus that is operated by means of gestures from a user rather than by touching a control or interface on the apparatus. For example, the touchless food dispensers disclosed herein dispense a food item (e.g., condiments, spices, chopped food, or the like) without a user touching the touchless food dispenser to control the dispensing.

As used herein, a "condiment" is a supplemental food that is added to food to impart or enhance its flavor. For example, a "condiment" includes food sauces (e.g., ketchup, mustard, relish, mayonnaise, BBQ, sauces, fruit sauces, tomato sauces, etc.), desert sauces and toppings (e.g., chocolate, strawberry, sprinkles, etc.), and prepared sauces such as Hollandaise sauces, salad dressings, liquids (e.g., oil, vinegar, etc.), syrups, etc.

As used herein, a "spice" is a seed, a fruit, a root, bark, or other plant substance primarily used for flavoring or coloring food. For example, spices (e.g., salt, pepper, oregano, cumin, etc.) have a definite flavor, aroma, intensity, and color to be used for enhancing the flavor and aroma of foods.

As used herein, a "packet" or a "pouch" is a package or container that contains a single-serving of food therein. Such packets can be made of paper, foil, plastic, or any other type of packing material. The single-serving can include any size, any amount, and/or any weight of food based on the type of food that the packet contains. For example, a single-serving of mayonnaise can be larger than a single-serving of ketchup, or vice-versa. A packet of a food can be, for example, less than one half ounce (0.5 oz), less than one ounce (1 oz), less than two ounces (2 oz), less than three ounces (3 oz), or any size containing a single-serving of the food. In preferred embodiments, a packet of food is less than one ounce (1 oz) or less than one half ounce (0.5 oz).

As used herein, the term "perforation" refers to the point of separation between individual packets of food and can be defined by a score, an opening, or a row of openings formed in the packets such that an individual packet can be separated from the other packets within a roll of packets.

Food, such as, condiments, spices, solid food, liquid foods (e.g., syrup, vinegar, oil), etc., is provided by many different types of food vendors, such as restaurants, supermarkets, concessions, food courts, food trucks, airports, ski lodges, etc. Such food can be provided in packets (e.g., packets of condiments, packets of spices, etc.), and/or can be provided in a dispenser such that the food is dispensed from the dispenser. In either method of providing the food, a user, such as a customer or an employee, needs to physically touch the packets or the dispenser (e.g., a handle of the dispenser that the user pushes to dispense the food). The packets, the dispensers, or the food itself, collects bacteria or viruses since multiple users touch the packets, the dispensers, and/or the food. Thus, providing food in such a way is unsanitary and can lead to cross-contamination on the packets, the dispenser, and the food. Further, some dispensers may include nozzles or the like that can be removed from the dispenser, cleaned, and replaced into the dispenser. Such nozzles are supposed to be cleaned daily to insure cleanliness of the nozzles. However, often the nozzles are not cleaned as much as required, and/or the nozzles are not properly or entirely cleaned. Accordingly, such nozzles are also unsanitary.

Another problem with providing food in such ways is that the amount of food dispensed or provided is inconsistent. For example, an employee may provide more packets to a customer than the customer actually uses, or the customer may dispense more food than they actually use. Further, the amount of food dispensed from the dispenser is unregulated and is dependent on how the user pushes down on the handle to pump the food from the dispenser. The excess packets or the excess food that is dispensed is often disposed of when the user does not use the excess food. Accordingly, by providing the food in such ways is wasteful and creates unnecessary costs for the business owner supplying the food.

Further, such methods of providing the food can be difficult or tedious for the employee or for the customer. For example, the packets of food (e.g., condiment packets) are difficult and time-consuming to manually open one by one. Often, the dispensers are manual dispensers that the user needs to manually push the handle to dispense the food. In some instances, the dispenser can include a machine that dispenses the food when the user pushes and holds a button. In such instance, the user still needs to physically touch the dispenser to dispense the food.

Therefore, there is a need for a touchless food dispenser, as disclosed herein. The touchless food dispensers of the present disclosure provide for an apparatus that automatically dispenses food without the user having to physically touch the touchless food dispenser. The food can include condiments, spices, chopped or sliced food (e.g., lettuce, onions, tomatoes, etc.), or any type of dispensable food. The touchless food dispenser can dispense the food, for example, onto another food item (e.g., onto a hamburger), into a receptacle (e.g., a condiment cup), onto a plate, into the user's hand (e.g., a condiment packet), or otherwise can dispense food from the touchless food dispenser. The touchless food dispensers can store various types of food for dispensing. For example, the touchless food dispensers can store different types of condiments, different types of spices, different types of chopped food, or combinations thereof (e.g., can store condiments, spices, and chopped food together).

The user can use gestures (e.g., moving a hand in front of the dispenser) to automatically dispense the desired food. In this way, the touchless food dispensers disclosed herein can dispense food without the user physically touching the food. The touchless food dispensers of the present disclosure can be configured for use by employees (e.g., back of the house), for use by customers (e.g., back of the house), or for use by any type of user. The touchless food dispensers can dispense a predetermined amount of food therein. For example, an operator, such as a business owner, can configure or otherwise program the touchless food dispenser with the predetermined amount of food to dispense every time a user gestures to dispense food. The predetermined amount of food can be measured by weight (e.g. ounces), by volume (e.g., fluid ounces, milliliters, etc.), or the like. In some embodiments, the user can input a desired an amount of food to dispense. For example, the user can input a number of servings to dispense. The servings can include a predetermined serving size (e.g., 1 serving equal to 1 fluid ounce of food, or 1 serving equal to 1 packet of food, etc.). The user can use a smartphone or the like to input the desired amount of servings to dispense. A mobile application can store the user's preferences or the like such that the user can dispense the same amount of food (e.g., by scanning a barcode, a QR code, or the like) from the touchless food dispenser.

In some embodiments, the touchless food dispenser can dispense packets of food (e.g., packets of condiments, packets of spices, etc.). The packets can be coupled together and bundled into a roll. As the packets are dispensed from the touchless food dispenser, the roll can unwind. When the roll is depleted of packets, the roll can be removed from the touchless food dispenser and replaced with a new roll of packets. The touchless food dispenser can automatically open the packets as the packets are being dispensed. In some embodiments, the touchless food dispenser can dispense the food from the packets.

In another embodiment, the touchless food dispenser stores the food therein and dispenses the food directly, rather than dispensing packets. For example, the touchless food dispenser can store various types of food in different vats, reservoirs, bags, or the like. The touchless food dispenser can pump or otherwise force the food out of the touchless food dispenser when the user gestures in front of the touchless food dispenser. The touchless food dispenser includes removable nozzles through which the food is dispensed. The removable nozzles include single-use nozzles that are removed from the touchless food dispenser after food has been dispensed through the nozzle. The removable nozzles can be removed and replaced with a new removable nozzle each time food has been dispensed. In some embodiments, the removable nozzles define a receptacle for receiving the food therein. The food can be dispensed into the removable nozzle and the user can take the removable nozzle with the food therein. In some embodiments, the touchless food dispenser can automatically remove and replace the removable nozzles.

Thus, the touchless food dispensers disclosed herein provide for dispensers that do not require users to physically touch the dispenser to cause the dispenser to dispense the food. The amount of food dispensed can be controlled, as detailed above, such that wasted food is reduced. Accordingly, the touchless food dispensers disclosed herein provide for various embodiments of a sanitary and portion-regulated apparatus to solve the problems detailed above.

Referring now to the drawings, FIG. 1 illustrates a schematic, front perspective view of a touchless food dispenser 10, according to an embodiment of the present disclosure. The arrangement of the components of the touchless food dispenser 10 shown in FIG. 1 are exemplary only, and the components may be arranged in any configuration, as desired, without deviating from the present disclosure. The touchless food dispenser 10 includes a casing 12 that defines a front side 14, a rear side 16, a left side 18, a right side 20, a bottom side 22, and a top side 24, per the orientation of the touchless food dispenser 10 shown in FIG. 1. While the exemplary embodiment shows the casing 12 having a generally rectangular configuration, the casing 12 of the touchless food dispenser 10 can have any configuration, shape, and/or size, as desired. The touchless food dispenser 10 can store one or more types of food within the casing 12 for being dispensed from the touchless food dispenser 10 (e.g., out of the casing 12), as detailed further below. For example, the touchless food dispenser 10 can store condiments, spices, chopped foods (e.g., onions, lettuce, tomatoes, etc.), or the like for being dispensed from the touchless food dispenser 10 into a receptacle (e.g., a condiment cup), onto a food item (e.g., onto a hamburger), or otherwise dispensed out of the touchless food dispenser 10. In some embodiments, the touchless food dispenser 10 can dispense out packets of food (e.g., a packet of ketchup) such that a user can grab or otherwise take the dispensed packets of food from the touchless food dispenser 10, as detailed further below.

The touchless food dispenser 10 includes one or more dispensing mechanisms 30 for dispensing one or more types of food, such as one or more condiments, from the touchless food dispenser 10. The one or more dispensing mechanisms 30 can include slots, nozzles, apertures, or any other dispensing mechanisms. In the exemplary embodiment, the one or more dispensing mechanisms 30 include three such dispensing mechanisms 30 including as a first dispensing mechanism 30a, a second dispensing mechanism 30b, and a third dispensing mechanism 30c. The one or more dispensing mechanisms 30 may include any number of dispensing mechanisms 30 for dispensing any number of types of food, as desired. The touchless food dispenser 10 includes a dispensing area 32 in which the one or more dispensing mechanisms 30 are oriented to dispense the food.

The touchless food dispenser 10 also includes one or more user proximity sensors 40 and one or more dispenser proximity sensors 42. The one or more user proximity sensors 40 are positioned and oriented to detect a user in front of, or otherwise near or proximate, the touchless food dispenser 10. The one or more user proximity sensors 40 produce signals indicative of when something (e.g., a user) is positioned in front of the touchless food dispenser 10. The signals from the one or more user proximity sensors 40 may be used to control the dispensing of the food from the touchless food dispenser 10, as detailed further below. For example, the signals from the one or more user proximity sensors 40 may be used to prevent dispensing of the food from the touchless food dispenser 10 when no signal is generated (e.g., there is no user in front of the touchless food dispenser 10). The one or more user proximity sensors 40 can include any type of proximity sensor for detecting the presence of nearby objects without any physical contact. For example, the proximity sensors can include a capacitive proximity sensor, a photoelectric proximity sensor, an optical proximity sensor, or the like. The proximity sensors can include any type of sensor for detecting an object, such as cameras, sonar, lidar, etc.

The one or more dispenser proximity sensors 42 are positioned and oriented to detect an object, such as a receptacle for receiving the dispensed food, a food item, a user's hand, etc., in front of, or below, a respective dispensing mechanism 30. The one or more dispenser proximity sensors 42 include a proximity sensor associated with each of the one or more dispensing mechanisms 30. For example, the one or more dispenser proximity sensors 42 include one or more first dispenser proximity sensors 42a associated with the first dispensing mechanism 30a, one or more second dispenser proximity sensors 42b associated with the second dispensing mechanism 30b, and one or more third dispenser proximity sensors 42c associated with the third dispensing mechanism 30c. The one or more dispenser proximity sensors 42 produce signals indicative of when something (e.g., a receptacle, a food item, a user's hand, etc.) is positioned below or in front of a respective dispensing mechanism 30. The signals from the one or more dispenser proximity sensors 42 may be used to control the dispensing of the food from the touchless food dispenser 10, as detailed further below. For example, the signals from the one or more dispenser proximity sensors 42 may be used to prevent dispensing of the food from the touchless food dispenser 10 when no signal is generated (e.g., there is no receptacle, no food item, no hand, etc. in front of, or below, a respective dispensing mechanisms 30). The one or more dispenser proximity sensors 42 can include any type of proximity sensor for detecting the presence of nearby objects without any physical contact. For example, the proximity sensors can include a capacitive proximity sensor, a photoelectric proximity sensor, an optical proximity sensor, or the like. The proximity sensors can include any type of sensor for detecting an object, such as cameras, sonar, lidar, etc.

In some embodiments, the touchless food dispenser 10 includes a display 50. The display 50 can display the various types of food that are available in the touchless food dispenser 10 for dispensing, can display a selected type of food for dispensing from the touchless food dispenser 10, can display an amount of food being dispensed, and/or can display advertisements, pictures, video or text. In some embodiments, the display 50 can function as a user input device to configure aspects of the touchless food dispenser 10. For example, the display 50 can display a graphical user interface configured to receive input from a user. In this way, the display 50 can include a touch screen display. In some embodiments, other forms of user interfaces may be utilized, such as physical keyboards, a computer mouse, gestures, or wireless communications for receiving input from a computing device, such as a mobile phone or the like, as detailed further below. In some embodiments, the display 50 may receive user input to configure a predetermined amount of food to dispense, to receive a selection of a type of food to dispense, or to configure other aspects of the touchless food dispenser 10.

In operation, the touchless food dispenser 10 can detect a user is in proximity of the touchless food dispenser 10 (e.g., by receiving the signal from the one or more user proximity sensors 40). When the user is in proximity to the touchless food dispenser 10, the user can select a particular type of food to dispense from the touchless food dispenser 10. For example, the user can gesture (e.g., with the user's hand) in front of, or below, a particular dispensing mechanism 30. The touchless food dispenser 10 can detect the user is in proximity to the particular dispensing mechanism 30 based on a signal received from the dispenser proximity sensor 42 associated with the particular dispensing mechanism 30. Based on the signal received from the dispenser proximity sensor 42, the touchless food dispenser 10 then dispenses a portion of the food from the dispensing mechanism 30. Thus, the touchless food dispenser 10 dispenses food without the user having to physically touch the touchless food dispenser 10 to cause the touchless food dispenser 10 to dispense the food.

In some embodiments, the touchless food dispenser 10 dispenses a predetermined amount of food every time a user gestures in front of, or below, a particular dispensing mechanism 30. For example, the touchless food dispenser 10 can be programmed or can otherwise store a predetermined amount of food (e.g., fluid ounces, milliliters, etc.) for dispensing. When the user gestures in front of, or below, the particular dispensing mechanism 30, the touchless food dispenser 10 dispenses the predetermined amount of food and then stops dispensing food until the user or another user gestures in front of, or below, the particular dispensing mechanism 30 again. In some embodiments, the touchless food dispenser 10 can dispense the food for as long as the user is gesturing in front of, or below, the particular dispensing mechanism 30. In some embodiments, the user can input a selection of a type of food to dispense and/or an amount of food to dispense via, for example, the display 50, a computing device (e.g., a smartphone), or the like. The user can then gesture in front of, or below, the particular dispensing mechanism 30 and the touchless food dispenser 10 will dispense the selected type of food and/or the selected amount of food when the user gestures in front of, or below, a particular dispensing mechanism 30.

Additional features and aspects of the present disclosure will become apparent as detailed below with respect to FIGS. 2A to 8.

Figure 2C:
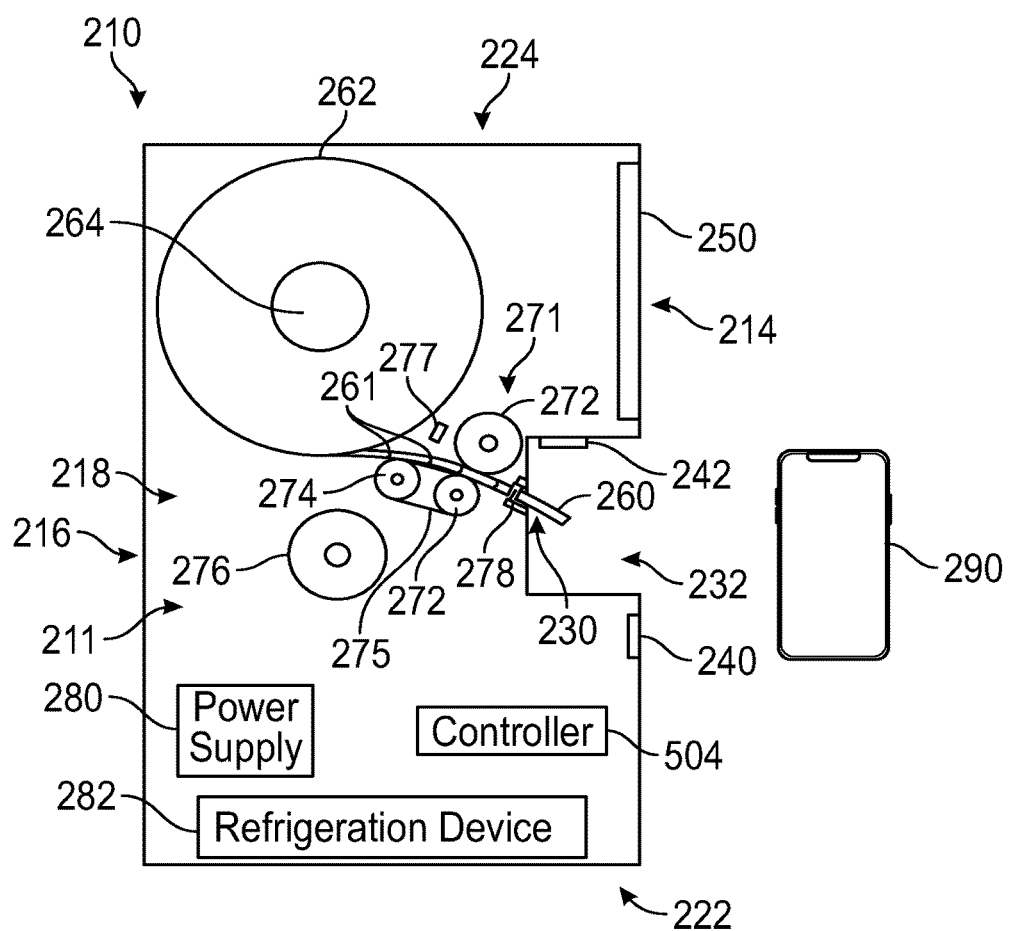
FIG. 2C illustrates a schematic, side cutaway view of the touchless food dispenser of FIG. 2A, according to the present disclosure.

FIGS. 2A to 2C illustrate various views of a touchless food dispenser 210, according to another embodiment. FIG. 2A illustrates a schematic, front perspective view of the touchless food dispenser 210, FIG. 2B illustrates a schematic, front cutaway view of the touchless food dispenser 210 with a front portion of the touchless food dispenser 210 removed such that an inner portion 211 of the touchless food dispenser 210 is shown, and FIG. 2C illustrates a schematic right side cutaway view of the touchless food dispenser 210 with a side of the touchless food dispenser 210 removed such that the inner portion 211 of the touchless food dispenser 210 is shown. The touchless food dispenser 210 can be utilized as the touchless food dispenser 10, shown and described with respect to FIG. 1. The arrangement of the components of the touchless food dispenser 210 shown in FIGS. 2A to 2C are exemplary only, and the components may be arranged in any configuration, as desired, without deviating from the present disclosure.

Referring to FIG. 2A, the touchless food dispenser 210 includes a casing 212 that defines a front side 214, a rear side 216, a left side 218, a right side 220, a bottom side 222, and a top side 224, per the orientation of the touchless food dispenser 210 shown in FIG. 2A. While the exemplary embodiment shows the casing 212 having a generally rectangular configuration, the casing 212 of the touchless food dispenser 210 can have any configuration, shape, and/or size, as desired. The touchless food dispenser 210 can store one or more types of food within the casing 212 for being dispensed from the touchless food dispenser 210, as detailed further below. For example, the touchless food dispenser 210 can store packets 260 of condiments, spices, chopped foods (e.g., onions, lettuce, tomatoes, etc.), or the like for being dispensed from the touchless food dispenser 210 (e.g., out of the casing 212) into a receptacle (e.g., a condiment cup), onto a food item (e.g., onto a hamburger), or otherwise dispensed out of the touchless food dispenser 210. The packets 260 can be bundled together in a roll and dispensed from the touchless food dispenser 210, as detailed further below.

The touchless food dispenser 210 includes one or more dispensing mechanisms, such as one or more apertures 230 for dispensing one or more types of food from the touchless food dispenser 210. The one or more apertures 230 can include holes or slots for dispensing the food or packets 260 of the food from the touchless food dispenser 210. In the exemplary embodiment, the one or more apertures 230 include four such apertures 230 including as a first aperture 230*a*, a second aperture 230*b*, a third aperture 230*c*, and a fourth aperture 230*d*. The one or more apertures 230 may include any number of apertures 230 for dispensing any number of types of food, as desired, and may be sized and shaped for dispensing food from the packets 260 or for dispensing the packets directly from the touchless food dispenser 210. The touchless food dispenser 210 includes a dispensing area 232 in which the one or more apertures 230 are oriented to dispense the food or the packets 260 of food from the touchless food dispenser 210.

The touchless food dispenser 210 also includes one or more user proximity sensors 240 and one or more dispenser proximity sensors 242. The one or more user proximity sensors 240 are positioned and oriented to detect a user in front of, or otherwise near or proximate, the touchless food dispenser 210, as detailed above with respect to the user proximity sensors 40 of FIG. 1. The one or more dispenser proximity sensors 242 are positioned and oriented to detect an object, such as a receptacle for receiving the dispensed food, a food item, a user's hand, etc., in front of, or below, a respective apertures 230, as detailed above with respect to the dispenser proximity sensors 42 of FIG. 1. The one or more dispenser proximity sensors 242 include a proximity sensor associated with each of the one or more apertures 230. For example, the one or more dispenser proximity sensors 242 include one or more first dispenser proximity sensors 242a associated with the first aperture 230a, one or more second dispenser proximity sensors 242b associated with the second aperture 230b, one or more third dispenser proximity sensors 242c associated with the third aperture 230c, and one or more fourth dispenser proximity sensors 242d associated with the fourth aperture 230d.

In some embodiments, the touchless food dispenser 210 includes a display 250. The display 250 can display the various types of food that are available in the touchless food dispenser 210 for dispensing, can display a selected type of food for dispensing from the touchless food dispenser 210, can display an amount of food being dispensed, and/or can display advertisements, pictures, video or text, as detailed above with respect to the display 50 of FIG. 1.

FIG. 2B shows the front side 214 of the inner portion 211 of the touchless food dispenser 210. As shown in FIG. 2B, the touchless food dispenser 210 includes one or more rolls 262 of packets 260. In the exemplary embodiment, the one or more rolls 262 of packets 260 include a first roll 262a of first packets 260a of food, a second roll 262b of second packets 260b of food, a third roll 262c of third packets 260c of food, and a fourth roll 262d of fourth packets 260d of food. Each roll 262 of packets 260 can include a different type of food. For example, the first packets 260a include a first type of food (e.g., ketchup), the second packets 260b include a second type of food (e.g., mustard), the third packets 260c include a third type of food (e.g., relish), and the fourth packets 260d include a fourth type of food (e.g., mayonnaise). The rolls 262 of packets 260 may include any number of rolls with any number of different types of food. The packets 260 of a respective roll 262 are coupled or otherwise connected together to form the respective roll 262. An individual packet 260 can be separated from the other packets 260 of the roll 262 when the individual packet 260 is dispensed from the touchless food dispenser 210, as detailed further below. In some embodiments, the rolls 262 can include a single packet 260 of food without perforations or other separations. In such embodiments, the touchless food dispenser 210 can dispense the food from the packet 260 out of the touchless food dispenser 210 without dispensing individual packets 260.

The packets 260 of food can include one or more perforations 261 (only one of which is labeled in FIG. 2B for clarity) that separate each packet 260 of a respective roll 262. Perforations refers to the point of separation between individual packets 260 of food and can be defined by a score, an opening, or a row of openings formed in the packets 260 such that an individual packet 260 can be separated from the other packets 260 of the respective roll 262. The perforations 261 are dimensioned to define an edge of an individual packet 260 and to assist in separation of individual packets 260 from the respective roll 262. Each roll 262 includes many perforations 261 separating the many different packets 260 on the respective roll 262. Each roll 262 can include any number of packets 260 as desired.

The touchless food dispenser 210 includes one or more food storage containers 270 for storing one or more types of food. For example, the one or more rolls 262 of packets 260 are mounted and stored within a respective food storage container 270. In the exemplary embodiment, the one or more food storage containers 270 include a first food storage container 270a that stores the first roll 262a, a second food storage container 270b that stores the second roll 262b, a third food storage container 270c that stores the third roll 262c, and a fourth food storage container 270d that stores the fourth roll 262d. The food storage containers 270 may include any number of food storage containers with any number of different types of food. In some embodiments, the touchless food dispenser 210 includes a single food storage container 270 that stores the various rolls 262. Each food storage container 270 may include a door or the like for providing access to the food storage container 270. In this way, an operator of the touchless food dispenser 210 can insert the rolls 262 into the food storage containers 270. In some embodiments, the touchless food dispenser 210 includes a single door that opens all of the food storage containers 270 at once. In some embodiments, each food storage container 270 includes a separate door such that each food storage container 270 can be opened individually. Thus, the rolls 262 can be removed and replaced with new rolls 262 when the rolls 262 are empty (e.g., after all or nearly all of the packets 260 of a roll 262 have been dispensed).

The touchless food dispenser 210 also includes a power supply 280, a refrigeration device 282, and a controller 504. The power supply 280 provides electric power to the various electronic components of the touchless food dispenser 210. The power supply 280 can include, for example, a power chord that plugs into a corresponding power outlet, one or more batteries, or any other type of power supply. The refrigeration device 282 can control the climate (e.g., the temperature) within the touchless food dispenser 210 such as to control the temperature of the food that is stored within the touchless food dispenser 210. In some embodiments, the touchless food dispenser includes a heating device to heat aspects of the touchless food dispenser 210. In exemplary embodiments, the heating and/or refrigeration devices may heat or cool the touchless food dispenser 210 to a specified temperature or within a specified temperature range to heat or to cool the food stored within the touchless food dispenser 210. The controller 504 can control aspects of the touchless food dispenser 210 to automatically dispense a portion of the food, as detailed further below.

FIG. 2C shows the right side 220 of the inner portion 211 of the touchless food dispenser 210. As shown in FIG. 2C, the touchless food dispenser 210 includes one or more mounting rollers 264 for mounting a respective roll 262 of packets 260 thereon. In this way, the rolls 262 are mounted within the inner portion 211 of the touchless food dispenser 210. The mounting rollers 264 can include a removable portion such that the rolls 262 can be removed and replaced with a new roll 262 when a respective roll 262 runs out or is otherwise low on packets 260. The packets 260 are arranged to be fed through the respective apertures 230 when the touchless food dispenser 210 is controlled to dispense the packets 260. For example, the apertures 230 are sized and shaped to receive the packets 260.

The touchless food dispenser 210 includes a powered roller assembly 271. The powered roller assembly 271 includes one or more drive rollers 272, one or more sensor rollers 274, and one or more electric motors 276. The one or more drive rollers 272 are generally cylindrical, rotatable rollers. The one or more drive rollers 272 are mechanically connected to the electric motor 276 to drive the one or more drive rollers 272 via a transmission. The transmission includes one or more gears or the like, or may include a belt and pulley, wheels, or other such power transmitting devices to transmit power from the electric motor 276 to the one or more drive rollers 272 to drive (e.g., to rotate) the one or more drive rollers 272. A belt 275 is looped about one of the driver rollers 272 and one of the sensor rollers 274. When the roll 262 of packets 260 of food is mounted within the touchless food dispenser 210, the packets 260 of the roll 262 are fed, or driven, by the belt 275 and towards the aperture 230 as the one or more drive rollers 272 rotate. As the packets 260 are driven between the one or more drive rollers 272, the one or more driver rollers 272 pinch or otherwise squeeze the packets 260. While the exemplary embodiment of FIG. 2C shows two such drive rollers 272, the touchless food dispenser 210 can include any number of drive rollers 272 as desired. For example, the packets 260 can be fed between a single drive roller 272 and a non-powered roller that is configured to be rotated by the drive roller 272. In some embodiments, the packets 260 are fed towards the aperture 230 by means other than rollers and belts, such as, for example, a mechanical or spring-loaded arm mechanism, or any other type of device for feeding the packets 260 towards the aperture 230 to be dispensed out of the aperture 230.

The one or more sensor rollers 274 are generally cylindrical, rotatable rollers. The one or more sensor rollers 274 are connectable to the electric motor 276 by a transmission, such as by gears, a belt and pulley, wheels, or the like. The one or more sensor rollers 274 are configured to be driven such that the one or more sensor rollers 274 have a slower surface speed than the one or more drive rollers 272. In this way, tension is created in the roll 262 of packets 260 between the one or more sensor rollers 274 and the one or more drive rollers 272 such that the perforations 261 can be expanded. Alternatively, the one or more sensor rollers 274 are not attached to the electric motor 276 but are configured to be rotated by contact with the packets 260.

The electric motor 276 is an electric machine that converts electrical energy into mechanical energy. For example, the electric motor 276 receives electric power from the power supply 280 and transmits mechanical power to the one or more drive rollers 272 via the transmission. The electric motor 276 can include any type of electric motor, as desired, for providing mechanical power to the one or more drive rollers 272.

The touchless food dispenser 210 also includes a packet sensor 277 for detecting the presence of a packet 260 as the packet 260 passes the packet sensor 277. For example, the packet sensor 277 is configured to generate a signal (e.g., a packet signal) indicative of the presence of a packet 260. The packet sensor 277 can sense the packets 260, and the controller 504 can determine a number of packets 260 that are being fed towards the aperture 230, perforations in the packets 260 as the packets 260 pass the packet sensor 277, and/or a length of a packet 260 as the packet 260 passes the packet sensor 277. The packet sensor 277 is a photoelectronic device or like device for detecting the presence of packets 260. In some embodiments, the packet sensor 277 detects the presence of a perforation 261 in the packets 260. In such embodiments, the packet sensor 277 includes a light source and a photo-conductive receiver operable to detect light from the light source. The sensor is configured to generate a signal when it receives the light from the light source. For example, the light source is normally blocked by the packets 260 between the light source and the photo-conductive receiver. However, if a perforation 261 is positioned between the light source and the photo-conductive receiver, then light passes through the perforation 261 to the receiver and the packet sensor 277 generates the perforation signal. The packet sensor 277 can include any type of sensor for detecting packets 260 and/or perforations 261 in the packets 260. For example, the packet sensor 277 can be capacitive and use a capacitive coupled the packet sensor 277. The packet sensor 277 can be based on mechanical detection, can be based on Hall effect, or can be based on a change in radio frequency, or any other method to detect individual packets 260 as the packets 260 move past the packet sensor 277.

The touchless food dispenser 210 also includes a cutting mechanism 278 for cutting or otherwise opening the packets 260 prior to, or in parallel with, a respective packet 260 being dispensed through the aperture 230. The cutting mechanism 278 includes a blade or the like for cutting or otherwise remove an individual packet 260 from the roll 262 such that the individual packet 260 can be removed from the touchless food dispenser 210. For example, a user can remove the dispensed packet 260 by tearing the packet 260 at the perforation 261 on the cutting mechanism 278. In some embodiments, cutting the packet 260 with the cutting mechanism 278 opens the packet 260 such that the user does not need to tear the packet 260 open after removing the packet 260 from the touchless food dispenser 210.

In some embodiments, the cutting mechanism 278 is a powered cutting mechanism such that the cutting mechanism 278 can automatically cut, tear, or otherwise separate or open a respective packet 260 as the packet 260 is being dispensed through the aperture 230. For example, the cutting mechanism 278 can include an actuator or other device for moving the blade such that the cutting mechanism 278 automatically cuts the packet 260 open or cuts the packets 260 at the perforation 261 to separate the packets 260 from the roll 262. In this way, the cutting mechanism 278 can receive electric power from the power supply 280 and can be controlled by the controller 504 to perform a cutting action, as detailed further below.

The touchless food dispenser 210 can also be in communication with a computing device 290, such as, for example, a smartphone, a table, a computer, a laptop, or the like. In some embodiments, the touchless food dispenser 210 can receive user input from the computing device 290. In this way, the user can input commands to the controller 504, to control aspects of the touchless food dispenser 210, as detailed further below. For example, the computing device 290 can display a graphical user interface (e.g., via a mobile application) such that the user can input a selection of a type of food for dispensing from the touchless food dispenser 210, a selection of an amount of the food to dispense, or any other user input can be input to the controller 504 from the computing device 290. In this way, the user can control aspects of the touchless food dispenser 210 without physically touching the touchless food dispenser 210. In some embodiments, the mobile application can store user preferences including the amount of food to dispense. The user preferences can be sent to the touchless food dispenser 210 (e.g., via a numerical code, via a barcode, via a QR code, via wireless communication, or the like) and the touchless food dispenser 210 can automatically dispense the food based on the user preferences.

Figure 3:
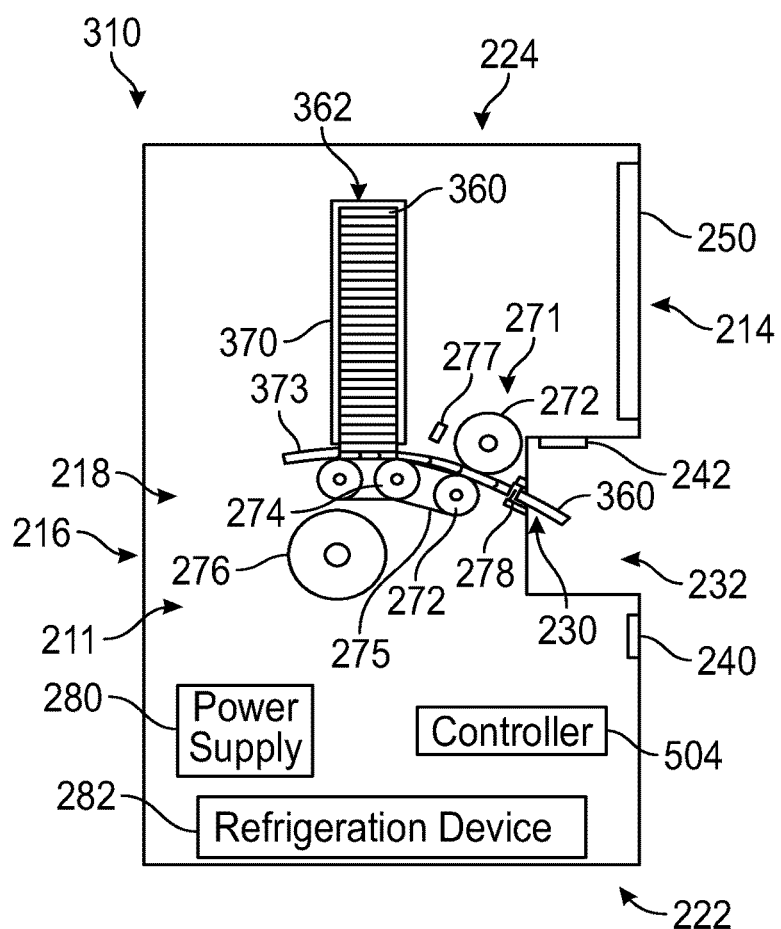
FIG. 3 is a schematic, side cutaway view of a touchless food dispenser, according to another embodiment.

FIG. 3 is a schematic, side cutaway view of a touchless food dispenser 310, according to another embodiment. The touchless food dispenser 310 is substantially similar to the touchless food dispenser 210 of FIGS. 2A to 2C. The touchless food dispenser 310, however, includes a stack 362 of packets 360 rather than a roll of packets. The touchless food dispenser 310 includes one or more food storage containers 370 for storing the stack 362 of packets 360. Each food storage container 370 can store packets 360 having a specific type of food, such as, for example, a stack of ketchup packets, a stack of mustard packets, a stack of relish packets, etc. The packets 360 of the stack 362 can be coupled together at one or more perforations or can be separate and individually placed in the stack 362 within a respective food storage container 370.

The one or more food storage containers 370 can include a feed mechanism 373 for releasing an individual packet 360 from the respective food storage container 370 such that individual packet 360 is directed towards the aperture 230. For example, the packets 360 can be deposited onto the belt 275 and directed towards the aperture 230. The feed mechanism 373 is a mechanical arm or spring-loaded arm that is controlled to be actuated (e.g., by the controller 504) to release an individual packet 360 from the food storage container 370 such that the packet 360 is directed towards the aperture 230 to be dispensed from the aperture 230. The feed mechanism 373 can include any type of mechanism or device for releasing packets 360 from the one or more food storage containers 370.

Figure 4:
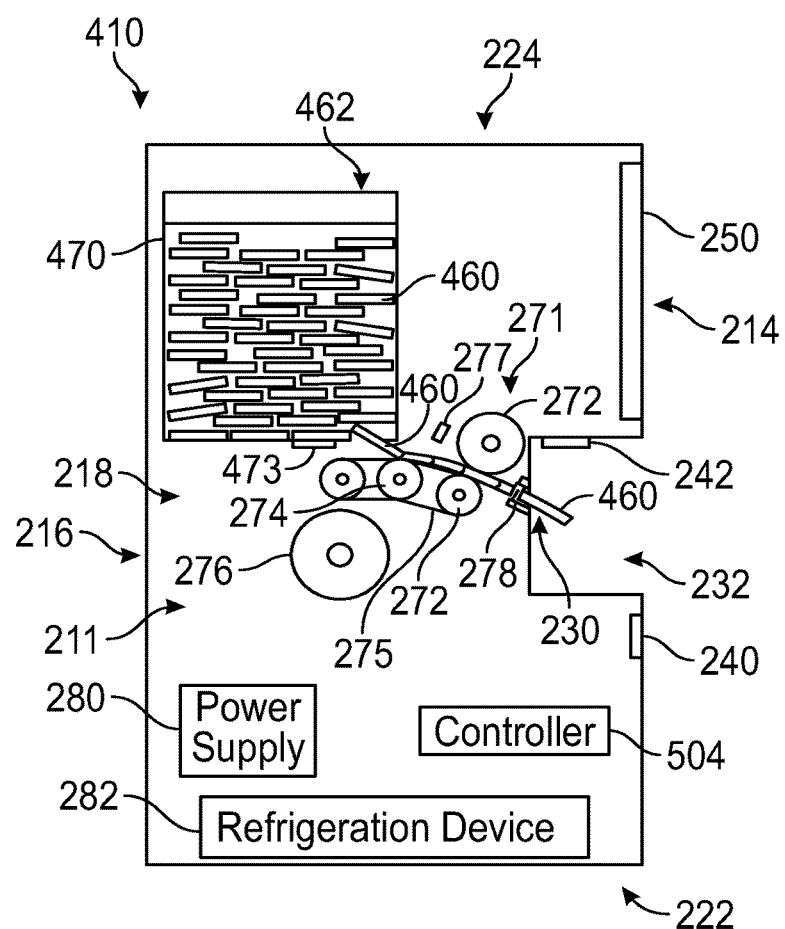
FIG. 4 is a schematic, side cutaway view of a touchless food dispenser, according to another embodiment.

FIG. 4 is a schematic, side cutaway view of a touchless food dispenser 410, according to another embodiment. The touchless food dispenser 410 is substantially similar to the touchless food dispenser 210 of FIGS. 2A to 2C. The touchless food dispenser 310, however, includes a pile 462 of packets 460 rather than a roll of packets or a stack of packets. The touchless food dispenser 410 includes one or more food storage containers 470 for storing the pile 462 of packets 460. Each food storage container 470 can store packets 460 having a specific type of food, such as, for example, a stack of ketchup packets, a stack of mustard packets, a stack of relish packets, etc. The packets 460 of the pile 462 can be coupled together at one or more perforations or can be separate and individually placed in the pile 462 within a respective food storage container 470. In this way, a person can pour or otherwise place the packets 460 into the food storage container 470 in order to fill the food storage container 470 with packets 460.

The one or more food storage containers 470 can include a feed mechanism 473 for releasing an individual packet 460 from the respective food storage container 470 such that individual packet 460 is directed towards the aperture 230. For example, the packets 460 can be deposited onto the belt 275 and directed towards the aperture 230. The feed mechanism 473 is a mechanical arm or spring-loaded arm that is controlled to be actuated (e.g., by the controller 504) to release an individual packet 460 from the food storage container 470 such that the packet 460 is directed towards the aperture 230 to be dispensed from the aperture 230. The feed mechanism 473 can include any type of mechanism or device for releasing packets 460 from the one or more food storage containers 470.

Figure 5:
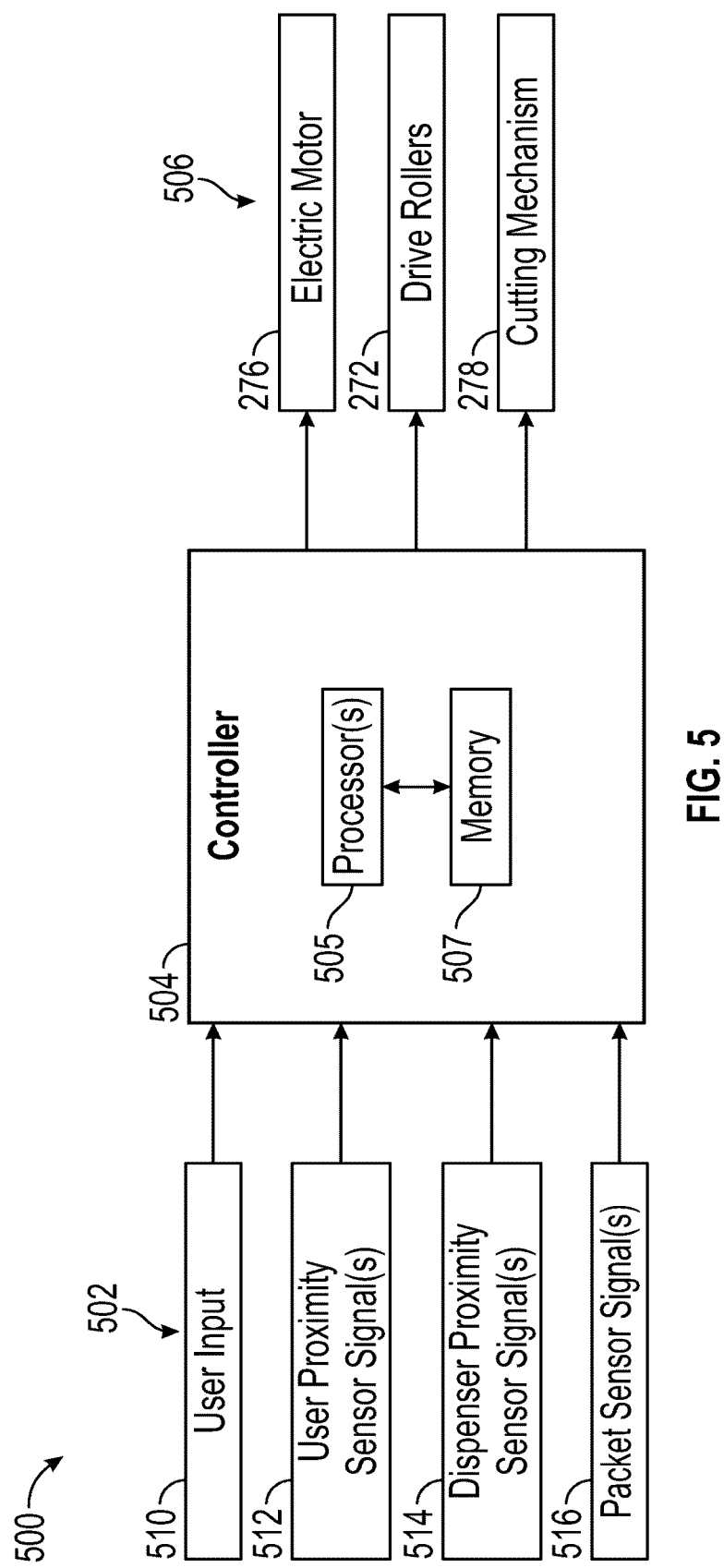
FIG. 5 is a block diagram of a touchless food dispenser control system, according to an embodiment of the present disclosure.

FIG. 5 is a block diagram of a touchless food dispenser control system 500, for operation and control of at least portions of the touchless food dispenser 210 (FIGS. 2A to 2C). While the touchless food dispenser 210 is described herein, the touchless food dispenser control system 500 can be used to control the touchless food dispenser 310 of FIG. 3 and/or the touchless food dispenser 410 of FIG. 4, respectively.

The touchless food dispenser control system 500 includes inputs 502, the controller 504, and outputs 506. The inputs 502 include user input 510 from the display 250 and/or from the computing device 290, one or more user proximity sensor signals 512 from the one or more user proximity sensors 240, one or more dispenser proximity sensor signals 514 from the one or more dispenser proximity sensors 242, and one or more packet sensor signals 516 from the one or more packet sensors 277. The outputs 506 include the electric motor 276, the one or more drive rollers 272, and the cutting mechanism 278. The electric motor 276 output includes control of the electric motor 276 to control operation of the electric motor 276. The drive rollers 272 output includes control of the drive rollers 272 to rotate the drive rollers 272. The cutting mechanism 278 output includes control of the cutting mechanism 278 to cut, slice, or otherwise tear a respective packet 260. The controller 504 receives the inputs 502, implements a method of dispensing food from a touchless food dispenser 210, and controls the outputs 506, as detailed with reference to FIG. 6 below.

The controller 504 may be one or more standalone controllers. In this embodiment, the controller 504 includes a computing device having one or more processors 505 and a memory 507. Accordingly, the controller 504 can be implemented as the computing device 1000 detailed below with respect to FIG. 10.

Figure 6:
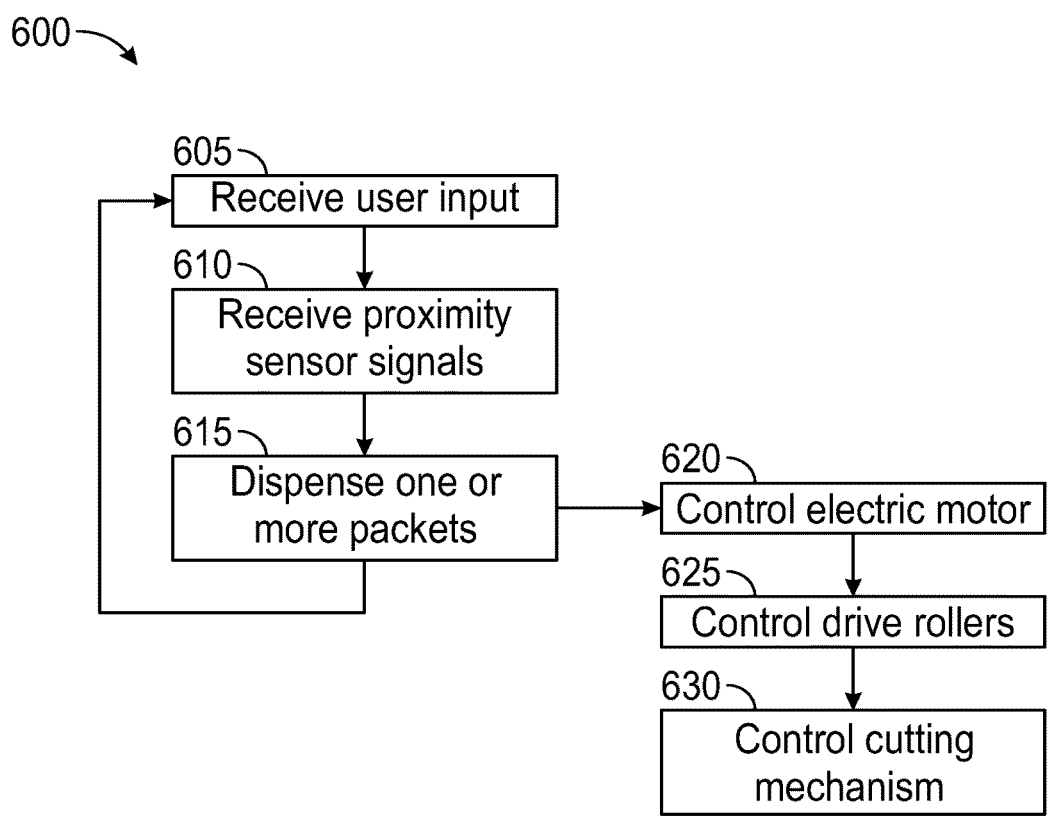
FIG. 6 is a flow diagram of a method of dispensing food from a touchless food dispenser, according to an embodiment of the present disclosure.

FIG. 6 is a flow diagram of a method 600 of dispensing food from a touchless food dispenser, according to an embodiment of the present disclosure. Reference is made to the touchless food dispenser 210 of FIGS. 2A-2C and to the touchless food dispenser control system 500 of FIG. 5 in the description of the method 600 below. The method 600 can also be utilized in controlling the touchless food dispenser 310 of FIG. 3 and the touchless food dispenser 410 of FIG. 4.

In step 605, the controller 504 receives user input 510. For example, the controller 504 receives a selection of a type of food to dispense from the touchless food dispenser 210, receives an amount of the food to dispense, receives a quantity of packets 260 to dispense, or the like. For example, the controller 504 can receive a selection of a type of condiment (e.g., ketchup, mustard, relish, etc.) to dispense, a type of spice (e.g., salt, pepper, oregano, etc.) to dispense, and/or a type of food (e.g., lettuce, onions, tomatoes, etc.) to dispense. The amount of food to dispense can include an amount by volume (e.g., fluid ounces, milliliters, etc.), an amount by weight (e.g., ounces), or the like. The quantity of packets 260 to dispense can include a number of packets 260 to dispense (e.g., 1 packet, 2 packets, 3 packets, 4 packets, etc.). The controller 504 can receive any type of user input for dispensing the food and/or the packets 260 from the touchless food dispenser 210 without the user having to physically touch the touchless food dispenser 210 to dispense the food or the packets 260.

In step 610, the controller 504 receives one or more proximity sensor signals. For example, the controller 504 receives the one or more user proximity sensor signals 512 from the one or more user proximity sensors 240 that indicate the user is proximate (e.g., standing in front of) the touchless food dispenser 210. The controller 504 can also receive the one or more dispenser proximity sensor signals 514 from one or more of the dispenser proximity sensors 242 that indicate the user is gesturing in front of the respective aperture 230 of the selected type of food.

In step 615, the controller 504 dispenses one or more packets 260 through the aperture 230. In this way, the roll 262 can be unwound as the packets 260 are dispensed. For example, the controller 504 can dispense the selected quantity of packets 260 to dispense. To determine the quantity of packets 260 that have been dispensed, the controller 504 receives the packet sensor signals 516 from the one or more packet sensors 277. The controller 504 can determine a number of packets 260 that are sensed by the packet sensor 277. For example, the controller 504 can determine the number of packets 260 based on the number of perforations 261 that have passed the packet sensors 277, based on the length of a packet 260 as the packet 260 passes the packet sensors 277, or based on any other means for determining a number of packets 260 that have passed the packet sensors 277.

Accordingly, the controller 504 can determine a quantity of packets 260 that have been dispensed based on the number of packets 260 sensed by the packet sensors 277. In this way, the controller 504 can determine when to stop dispensing the packets 260 from the touchless food dispenser 210. For example, the controller 504 can automatically stop dispensing packets 260 from the touchless food dispenser 210 when the selected quantity of packets 260 has been dispensed.

To dispense the one or more packets 260, in step 620, the controller 504 controls the electric motor 276 to turn on the electric motor. In step 625, the controller 504 controls the drive rollers 272 to rotate the drive rollers 272. Rotation of the drive rollers 272 causes the packets 260 to cycle between the drive rollers 272. For example, as the drive rollers 272 rotate, the drive rollers 272 pull the packets 260 towards and out of the aperture 230 such that the roll 262 unwinds. In step 630, the controller 504 controls the cutting mechanism 278 to cut or otherwise tear a respective packet 260 to open the respective packet 260 prior to the packet 260 being dispensed from the aperture 230. In this way, the controller 504 can automatically open the packets 260 as the packets 260 are being dispensed.

In some embodiments, the controller 504 can dispense one packet 260 at a time such that each packet 260 is individually cut and removed from the roll 262 as the packet 260 is dispensed from the touchless food dispenser 210. In some embodiments, the controller 504 can dispense multiple packets 260 at a time. For example, the controller 504 can dispense five packets 260 at a time and cut only the fifth packet 260 to remove the packets 260 from the roll 262. In some embodiments, the controller 504 can dispense the selected quantity of packets 260 at one time. For example, if the selected quantity of packets 260 is eight packets 260, the controller 504 can control the touchless food dispenser 210 to dispense eight packets 260 and to cut the eighth packet 260 to remove the eight packets 260 from the roll 262.

In some embodiments, the controller 504 can control the drive rollers 272, as detailed above, to squeeze or otherwise force the food out of the packets 260 to dispense the food out of the aperture 230 rather than dispensing the packets 260 themselves out of the aperture 230. For example, the cutting mechanism 278 can cut a front end of the packets 260 (e.g., an end facing the aperture 230 when the packet 260 is within the touchless food dispenser 210) and the food is squeezed out of the packets 260 and through the aperture 230 as the packets 260 pass through the drive rollers 272. In some embodiments, the roll 262 can comprise a single, continuous packet 260 such that there are no perforations. In such embodiments, the packet 260 can be opened (e.g., manually by an operator or automatically by the cutting mechanism 278) and the food can be dispensed from the packet 260 as the packet 260 passes through the drive rollers 272.

In some embodiments, the controller 504 can receive a user input of a selection of an amount of food to dispense. The controller 504 can dispense the amount of food, can determine an amount of food that has been dispense, and can automatically stop dispensing when the selection of the amount of food has been dispensed. In some embodiments, the controller 504 can be programmed to dispense a predetermined amount of the food or a predetermined quantity of packets 260 every time a user gestures in front of a respective dispenser proximity sensor 242. For example, an operator of the touchless food dispenser 210 can set the predetermined amount of food (e.g., 1 ounce, 2 ounces, 3 ounces, etc.) or the predetermined quantity of packets 260 (e.g., 1 packet, 2 packets, 3 packets, etc.) to dispense. In such embodiments, the controller 504 need not receive a user input selection of the amount of food or a user input selection of the quantity of packets 260 from a user that desires to dispense the food or the packets 260.

In some embodiments, the controller 504 can control the feed mechanism 373 (FIG. 3) and/or the feed mechanism 473 (FIG. 4) to release the packets from the food storage containers and towards the aperture 230 to dispense the packets out of the aperture 230, as detailed above.

FIGS. 7A and 7B illustrate various views of a touchless food dispenser 710, according to another embodiment. FIG. 7A illustrates a schematic, front perspective view of the touchless food dispenser 710, and FIG. 7B illustrates a schematic, front cutaway view of the touchless food dispenser 710 with a front portion of the touchless food dispenser 710 removed such that an inner portion 711 of the touchless food dispenser 710 is shown. The touchless food dispenser 710 can be utilized as the touchless food dispenser 10, shown and described with respect to FIG. 1. The arrangement of the components of the touchless food dispenser 710 shown in FIGS. 7A to 7B are exemplary only, and the components may be arranged in any configuration, as desired, without deviating from the present disclosure.

Referring to FIG. 7A, the touchless food dispenser 710 includes a casing 712 that defines a front side 714, a rear side 716, a left side 718, a right side 720, a bottom side 722, and a top side 724, per the orientation of the touchless food dispenser 710 shown in FIG. 7A. While the exemplary embodiment shows the casing 712 having a generally rectangular configuration, the casing 712 of the touchless food dispenser 710 can have any configuration, shape, and/or size, as desired. The touchless food dispenser 710 can store one or more types of food within the casing 712 for being dispensed from the touchless food dispenser 710, as detailed further below. For example, the touchless food dispenser 710 can store condiments, spices, chopped foods (e.g., onions, lettuce, tomatoes, etc.), or the like for being dispensed from the touchless food dispenser 710 into a receptacle 760 (e.g., a condiment cup), onto a food item (e.g., onto a hamburger), or otherwise dispensed out of the touchless food dispenser 710.

The touchless food dispenser 710 includes one or more dispensing mechanisms, such as one or more removable nozzles 730 for dispensing one or more types of food 758 from the touchless food dispenser 710. The one or more removable nozzles 730 can include apertures or the like for dispensing the food 758 from the touchless food dispenser 710. In the exemplary embodiment, the one or more removable nozzles 730 include three such removable nozzles 730 including as a first removable nozzle 730a, a second removable nozzle 730b, and a third removable nozzle 730c. The one or more removable nozzles 730 may include any number of removable nozzles 730 for dispensing any number of types of food 758, as desired, and may be sized and shaped for dispensing various types of food from the touchless food dispenser 710. The touchless food dispenser 710 includes a dispensing area 732 in which the one or more removable nozzles 730 are oriented to dispense the food 758 food from the touchless food dispenser 710.

Each of the removable nozzles 730 includes one or more clasps 731. For example, the one or more clasps 731 can be pinch clasps that can be pinched and inserted into a corresponding aperture 729 (FIG. 7B) or the like on the touchless food dispenser 710 and can expand within the aperture 729 (FIG. 7B) to secure the removable nozzles 730 to the touchless food dispenser 710. The removable nozzles 730 can be single-use nozzles such that the removable nozzles 730 are replaced after each use of the removable nozzle 730 (e.g., after each time food is dispensed through the removable nozzle 730), as detailed further below. Thus, the removable nozzles 730 can be removed from the touchless food dispenser 710 and replaced with new removable nozzles 730. In some embodiments, the removable nozzles 730 can include threads that can be threaded into corresponding threads in the apertures 729 (FIG. 7B). The removable nozzles 730 can include any apparatus for allowing the removable nozzles 730 to be removed from the touchless food dispenser 710.

The touchless food dispenser 710 also includes one or more user proximity sensors 740 and one or more dispenser proximity sensors 742. The one or more user proximity sensors 740 are positioned and oriented to detect a user in front of, or otherwise near or proximate, the touchless food dispenser 710, as detailed above with respect to the user proximity sensors 40 of FIG. 1. The one or more dispenser proximity sensors 742 are positioned and oriented to detect an object, such as a receptacle for receiving the dispensed food, a food item, a user's hand, etc., in front of, or below, a respective removable nozzle 730, as detailed above with respect to the dispenser proximity sensors 42 of FIG. 1. The one or more dispenser proximity sensors 742 include a proximity sensor associated with each of the one or more removable nozzles 730. For example, the one or more dispenser proximity sensors 742 include one or more first dispenser proximity sensors 742a associated with the first removable nozzle 730a, one or more second dispenser proximity sensors 742b associated with the second removable nozzle 730b, and one or more third dispenser proximity sensors 742c associated with the third removable nozzle 730c.

In some embodiments, the touchless food dispenser 710 includes a display 750. The display 750 can display the various types of food that are available in the touchless food dispenser 710 for dispensing, can display a selected type of food for dispensing from the touchless food dispenser 710, can display an amount of food being dispensed, and/or can display advertisements, pictures, video or text, as detailed above with respect to the display 50 of FIG. 1.

FIG. 7B shows the front side 714 of the inner portion 711 of the touchless food dispenser 710. The dispenser proximity sensors 742 (FIG. 7A) are removed from FIG. 7B for clarity. As shown in FIG. 7B, the touchless food dispenser 710 includes one or more apertures 729 (shown schematically by dashed lines in FIG. 7B) for receiving the removable nozzles 730. For example, the one or more apertures include a first aperture 729a for receiving the first removable nozzle 730a, a second aperture 729b for receiving the second removable nozzle 730b, and a third aperture 729c for receiving the third removable nozzle 730c. The one or more apertures 729 may include any number of apertures for receiving any number of removable nozzles 730.

As shown in FIG. 7B, the touchless food dispenser 710 includes one or more food storage containers 770 for storing one or more types of food. In the exemplary embodiment, the one or more food storage containers 770 include a first food storage container 770a that stores a first type of food (e.g., ketchup), a second food storage container 770b that stores a second type of food (e.g., mustard), and a third food storage container 770c that stores a third type of food (e.g., relish). The food storage containers 770 may include any number of food storage containers with any number of different types of food, and can store any amount of food therein. In some embodiments, the touchless food dispenser 710 includes a single food storage container 770 that stores various types of food. The food may be stored directly within the food storage containers 770. In some embodiments, the food is stored in one or more food-containing bags 772 that are inserted into the one or more food storage containers 770. For example, the one or more food-containing bags 772 include a first food-containing bag 772a within the first food storage container 770a, a second food-containing bag 772b within the second food storage container 770b, and a third food-containing bag 772c within the third food storage container 770c. Each food-containing bag 772 may store a different type of food. The food-containing bags 772 may include any number of food-containing bags for containing any number of different types of food.

Each food storage container 770 may include a door or the like for providing access to the food storage container 770. In this way, an operator of the touchless food dispenser 710 can insert the food-containing bags 772 into the food storage containers 270. In some embodiments, the touchless food dispenser 710 includes a single door that opens all of the food storage containers 770 at once. In some embodiments, each food storage container 770 includes a separate door such that each food storage container 770 can be opened individually. Thus, the food-containing bags 772 can be removed and replaced with new food-containing bags 772 when the food-containing bags 772 are empty or nearly empty (e.g., after all or nearly all of the food 758 of a food-containing bag 772 has been dispensed). In some embodiments, the operator can refill the food storage containers 770 directly, for example, by pouring additional food from the food-containing bags 772 into the food storage container 770, rather than replacing an entire food-containing bag 772 with a new food-containing bag 772. In some embodiments, rather than food-containing bags 772, the food storage containers 770 can include vats, reservoirs, or the like for storing food therein.

The touchless food dispenser 710 also includes one or more tubes 774 that provide fluid communication between the one or more food-containing bags 772 and the one or more removable nozzles 730. In this way, the food can be dispensed from a respective food-containing bag 772 through a respective removable nozzle 730 and out of the touchless food dispenser 710, as detailed further below. In the exemplary embodiment, the one or more tubes 774 include a first tube 774a between the first food-containing bag 772a and the first removable nozzle 730a, a second tube 774b between the second food-containing bag 772b and the second removable nozzle 730b, and a third tube 774c between the third food-containing bag 772c and the third removable nozzle 730c. The one or more tubes 774 can include any number of tubes 774 for providing fluid communication between the food-containing bags 772 and the removable nozzles 730. The one or more tubes 774 can include flexible tubes, such as rubber tubes or the like, to carry food from the food-containing bags 772 to the removable nozzles 730.

The touchless food dispenser 710 also includes a power supply 280, one or more pumps 781, a refrigeration device 782, and a controller 804. The power supply 780 provides electric power to the various electronic components of the touchless food dispenser 710. The power supply 780 can include, for example, a power chord that plugs into a corresponding power outlet, one or more batteries, or any other type of power supply. The one or more pumps 781 can include any type of pump for pushing or otherwise moving the food from the food-containing bags 772 through the removable nozzles 730. For example, the one or more pumps 781 are coupled to the food-containing bags 772 via tubing (e.g., the tubes 774) or the like. In the exemplary embodiment, the one or more pumps 781 include a first pump 781a associated with the first food-containing bag 772a, a second pump 781b associated with the second food-containing bag 772b, and a third pump 781c associated with the third food-containing bag 772c. The one or more pumps 781 can include any number of different pumps for pumping the food from the food-containing bags 772 through the removable nozzles 730 to dispense food from the touchless food dispenser 710.

The refrigeration device 782 can control the climate (e.g., the temperature) within the touchless food dispenser 710 such as to control the temperature of the food that is stored within the touchless food dispenser 710. In some embodiments, the touchless food dispenser includes a heating device to heat aspects of the touchless food dispenser 710. In exemplary embodiments, the heating and/or refrigeration devices may heat or cool the touchless food dispenser 710 to a specified temperature or within a specified temperature range to heat or to cool the food stored within the touchless food dispenser 710. The controller 804 can control aspects of the touchless food dispenser 710 to automatically dispense a portion of the food, as detailed further below.

The touchless food dispenser 710 can also be in communication with a computing device 790, such as, for example, a smartphone, a table, a computer, a laptop, or the like. In some embodiments, the touchless food dispenser 710 can receive user input from the computing device 790. In this way, the user can input commands to the controller 804, to control aspects of the touchless food dispenser 710, as detailed further below. For example, the computing device 790 can display a graphical user interface (e.g., via a mobile application or the like) such that the user can input a selection of a type of food for dispensing from the touchless food dispenser 710, a selection of an amount of the food to dispense, or any other user input can be input to the controller 804 from the computing device 790. In this way, the user can control aspects of the touchless food dispenser 710 without physically touching the touchless food dispenser 710. In some embodiments, the mobile application can store user preferences including the amount of food to dispense. The user preferences can be sent to the touchless food dispenser 710 (e.g., via a numerical code, via a barcode, via a QR code, via wireless communication, or the like) and the touchless food dispenser 710 can automatically dispense the food based on the user preferences.

In some embodiments, the removable nozzles 730 define a receptacle into which the food is dispensed. In this way, a portion of food can be dispensed into a respective removable nozzle 730 and the user can remove the removable nozzle 730 to take the dispensed food from the touchless food dispenser 710. In some embodiments, the removable nozzles 730 can be automatically removed and replaced. For example, the touchless food dispenser 710 can store a plurality of removable nozzles 730 associated with each of the different food storage containers 770. The controller 804 can control the touchless food dispenser 710 to dispense the food and to remove the removable nozzle 730 from the aperture 729 after the food has been dispensed. A different (e.g., a new) removable nozzle 730 can then be inserted into the aperture 729 (e.g., the different removable nozzle 730 can drop down or otherwise be inserted into the aperture 729), as detailed further below.

Figure 7C:
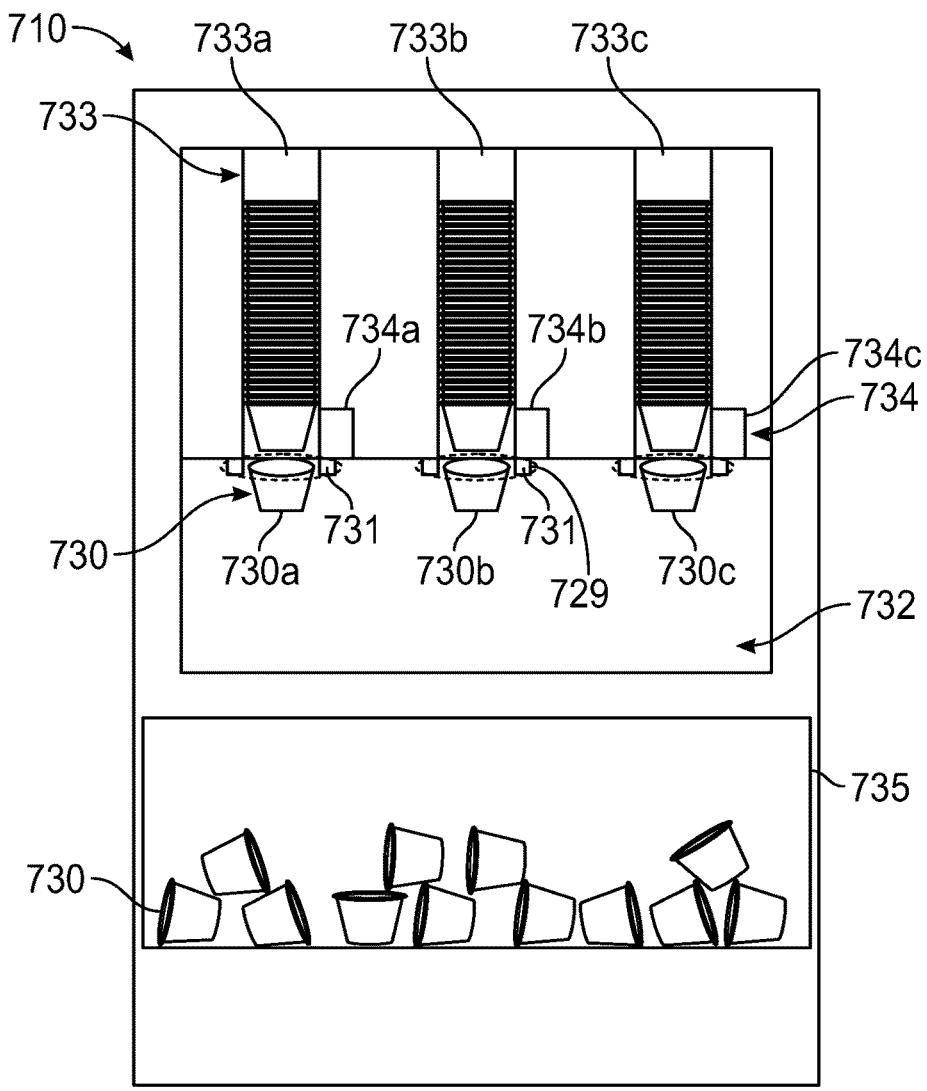
FIG. 7C is a schematic, front cutaway view of the touchless food dispenser of FIG. 7A, according to the present disclosure.

FIG. 7C is a schematic, front cutaway view of the touchless food dispenser 710, according to the present disclosure. The view of FIG. 7C shows one or more nozzle containers 733, and the food storage containers 770 are not shown in this view for clarity. The one or more nozzle containers 733 can be in front of, behind, or in line with, the one or more food storage containers 770. The one or more nozzle containers 733 store the removable nozzles 730 therein. For example, the one or more nozzle containers 733 include a first nozzle container 733a for storing a plurality of first removable nozzles 730a, a second nozzle container 733b for storing a plurality of second removable nozzles 730b, and a third nozzle container 733c for storing a plurality of third removable nozzles 730c. The one or more nozzle containers 733 can include any number of nozzle containers 733 for containing any number of different removable nozzles 730.

Figure 8:
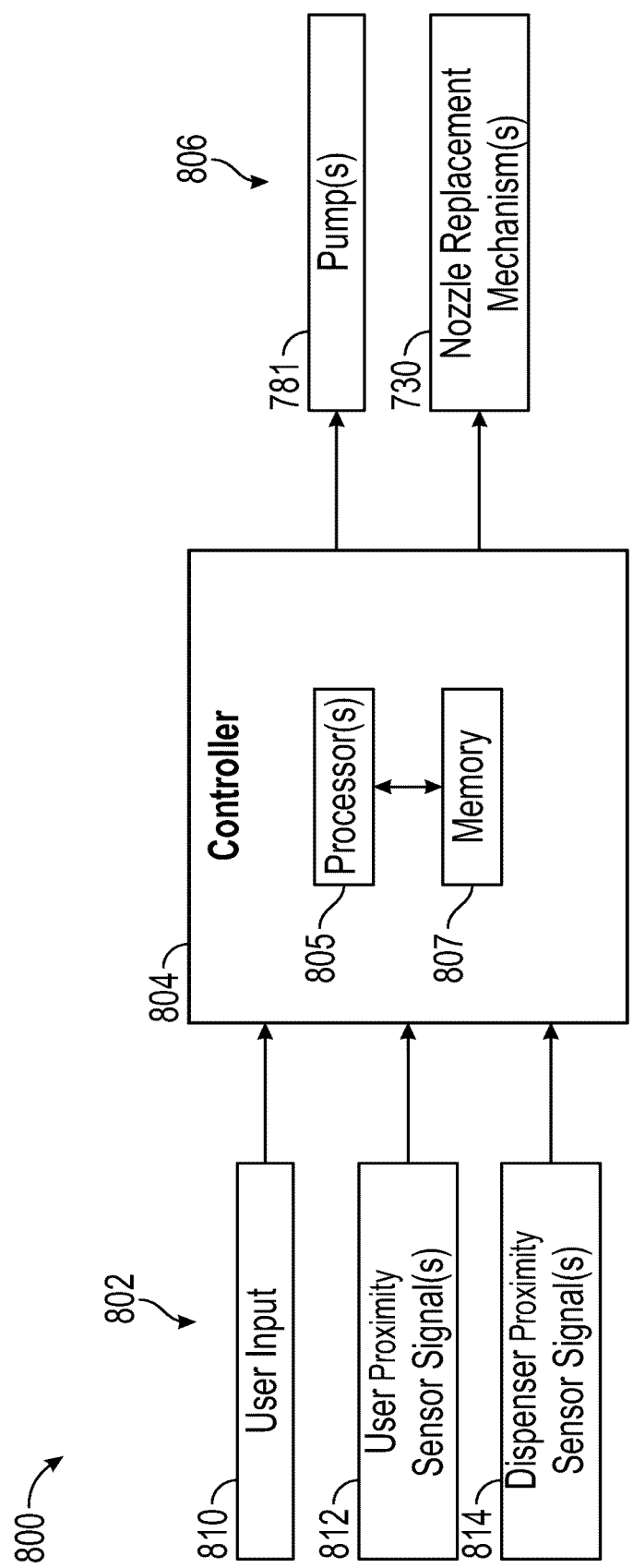
FIG. 8 is a block diagram of a touchless food dispenser control system, according to another embodiment of the present disclosure.

The touchless food dispenser 710 also includes one or more nozzle replacement mechanisms 734 for replacing the removable nozzles 730 after a respective removable nozzle 730 has been used. The one or more nozzle replacement mechanisms 734 include an electro-mechanical device that is controlled by the controller 804 (FIGS. 7B and 8). The one or more nozzle replacement mechanisms 734 can be controlled to remove a respective removable nozzle 730 after food has been dispensed through or into the removable nozzle 730. For example, the one or more nozzle replacement mechanisms 734 can open the clasps 731 such that the removable nozzle 730 drops or is otherwise placed into a disposal container 735. In this way, used removable nozzles 730 can be disposed in the disposal container 735 and a person (e.g., an employee or owner of the touchless food dispenser 710) can remove the disposal container 735 to dispose the used removable nozzles 730. In some embodiments, the one or more nozzle replacement mechanisms 734 can unscrew the removable nozzle 730 from the threaded connection to remove the removable nozzle 730 from the aperture 729. In embodiments in which the food is dispensed into the removable nozzle 730, the one or more nozzle replacement mechanisms 734 can remove the removable nozzle 730 from the aperture 729 such that the user can take the removable nozzle 730 from the touchless food dispenser 710.

The one or more nozzle replacement mechanisms 734 can be controlled to insert a different removable nozzle 730 from the stack of removable nozzles 730 in a respective nozzle container 733. In this way, the one or more nozzle replacement mechanisms 734 can automatically remove a used removable nozzle 730 and replace the used removable nozzle 730 with a different removable nozzle 730. For example, the touchless food dispenser 710 includes a first state in which the food is dispensed through a first removable nozzle 730 in the first aperture 729a, and a second state in which the food is dispensed through a different or second removable nozzle 730 that has been inserted into the first aperture 729a after the first removable nozzle 730 has been removed by the one or more nozzle replacement mechanisms 734. The one or more nozzle replacement mechanisms 734 can include a first nozzle replacement mechanism 734a associated with the plurality of first removable nozzles 730a, a second nozzle replacement mechanism 734b associated with the plurality of second removable nozzles 730b, and a third nozzle replacement mechanism 734c associated with the plurality of third removable nozzles 730c. The one or more nozzle replacement mechanisms 734 can include any number of nozzle replacement mechanisms 734 for removing and replacing the removable nozzles 730.

FIG. 8 is a block diagram of a touchless food dispenser control system 800, for operation and control of at least portions of the touchless food dispenser 710 (FIGS. 7A to 7C). The touchless food dispenser control system 800 includes inputs 802, the controller 804, and outputs 806. The inputs 802 include user input 810 from the display 750 and/or from the computing device 790, one or more user proximity sensor signals 812 from the one or more user proximity sensors 740, and one or more dispenser proximity sensor signals 814 from the one or more dispenser proximity sensors 742. The outputs 806 include the one or more pumps 781 and the one or more removable nozzles 730. The pumps 781 output includes control of the one or more pumps 781 to control operation of the one or more pumps 781. The nozzle replacement mechanism 734 output includes control of the one or more nozzle replacement mechanisms 734 to remove and/or replace the removable nozzles 730. The controller 804 receives the inputs 802, implements a method of dispensing food from a touchless food dispenser 710, and controls the outputs 806, as detailed with reference to FIG. 9 below.

The controller 804 may be one or more standalone controllers. In this embodiment, the controller 804 includes a computing device having one or more processors 805 and a memory 807. Accordingly, the controller 804 can be implemented as the computing device 1000 detailed below with respect to FIG. 10.

Figure 9:
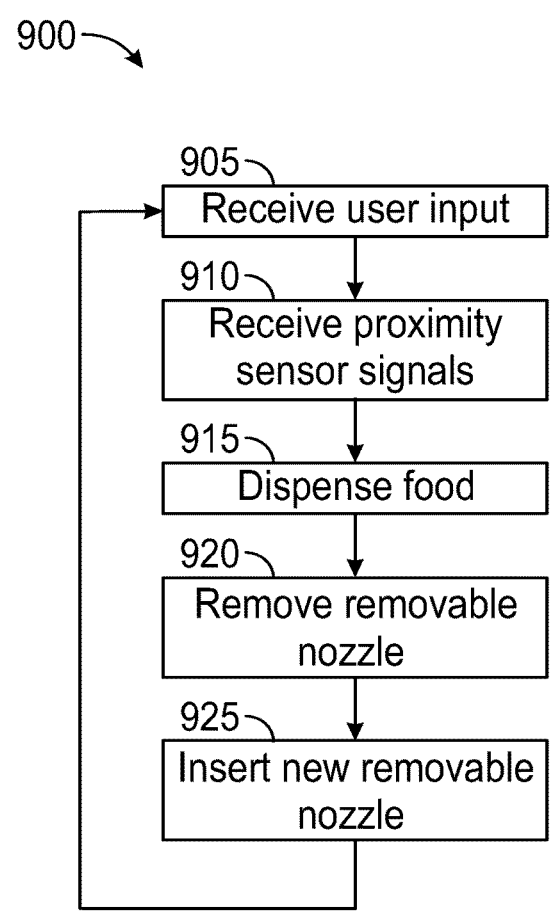
FIG. 9 is a flow diagram of a method of dispensing food from a touchless food dispenser, according to another embodiment of the present disclosure.

FIG. 9 is a flow diagram of a method 900 of dispensing food from a touchless food dispenser, according to another embodiment of the present disclosure. Reference is made to the touchless food dispenser 710 of FIGS. 7A to 7C and to the touchless food dispenser control system 800 of FIG. 8 in the description of the method 900 below.

In step 905, the method 900 includes receiving user input 810. For example, the controller 804 receives user input 810. The controller 804 can receive a selection of a type of food 758 to dispense from the touchless food dispenser 710, can receive an amount of the food 758 to dispense, or the like. For example, the controller 804 can receive a selection of a type of condiment (e.g., ketchup, mustard, relish, etc.) to dispense, a type of spice (e.g., salt, pepper, oregano, etc.) to dispense, and/or a type of food (e.g., lettuce, onions, tomatoes, etc.) to dispense. The amount of food 758 to dispense can include an amount by volume (e.g., fluid ounces, milliliters, etc.), an amount by weight (e.g., ounces), or the like. The controller 804 can receive any type of user input for dispensing the food 758 from the touchless food dispenser 710 without the user having to physically touch the touchless food dispenser 710 to dispense the food 758.

In step 910, the method 900 includes receiving one or more proximity sensor signals. For example, the controller 804 receives the one or more user proximity sensor signals 812 from the one or more user proximity sensors 740 that indicate the user is proximate (e.g., standing in front of) the touchless food dispenser 710. The controller 804 can also receive the one or more dispenser proximity sensor signals 814 from one or more of the dispenser proximity sensors 742 that indicate the user is gesturing in front of, or below, a respective removable nozzle 730 of the selected type of food 758.

In step 915, the method 900 includes dispensing the food 758 through the removable nozzle 730. For example, the controller 804 dispenses the food 758 through the removable nozzle 730. For example, the controller 804 can dispense the selected amount of food 758. To dispense the food 758, the controller 804 can control one or more of the pumps 781 to pump the food 758 from the food-containing bag 772, through the tube 774, and through the removable nozzle 730. In this way, the food 758 is dispensed into a receptacle 760, onto a food item, or otherwise dispensed from the touchless food dispenser 710. In some embodiments, when the removable nozzles 730 define receptacles, the food 758 can be dispensed into the removable nozzles 730. In this way, the controller 804 can dispense a predetermined amount of food into the removable nozzle 730 and the user can remove the removable nozzle 730 with the food 758 therein from the touchless food dispenser 710. For example, the controller 804 can dispense an amount of food 758 corresponding to a volume of the removable nozzle 730.

The controller 804 can also determine an amount of food 758 that has been dispensed. For example, the controller 804 can determine the amount of food 758 that has been dispensed based on the pumping action of the pumps 781, based on a sensor that senses the food 758 passing through the tubes 774 or through the removable nozzle 730, based on a weight of the food 758 in the food-containing bag 772, and/or by any other means for determining an amount of the food 758 that has been dispensed. In this way, the controller 804 can determine when to stop dispensing the food 758 from the touchless food dispenser 710. For example, the controller 804 can automatically stop dispensing the food 758 from the touchless food dispenser 710 when the selected amount of food 758 has been dispensed.

In some embodiments, the controller 804 can be programmed to dispense a predetermined amount of the food 758 every time a user gestures in front of, or below, a respective dispenser proximity sensor 742. For example, an operator of the touchless food dispenser 710 can set the predetermined amount of food (e.g., 1 fluid ounce, 2 fluid ounces, 3 fluid ounces, etc.) to dispense. In such embodiments, the controller 804 need not receive a user input selection of the amount of food 758 from a user that desires to dispense the food 758 from the touchless food dispenser 710.

After the food 758 has been dispensed, in step 920, the method 900 includes removing the removable nozzle 730. For example, the user can remove the removable nozzle 730 and/or the operator can remove the removable nozzle 730 from the aperture 729. In some embodiments, the controller 804 can control the touchless food dispenser 710 to automatically remove the removable nozzle 730. For example, the controller 804 can control an actuator or like device, such as the one or more nozzle replacement mechanisms 734, such that the removable nozzle 730 is removed from the aperture 729. In some embodiments, the user or the operator can dispose of the removable nozzle 730. In some embodiments, the removable nozzle 730 can be disposed of in the disposal container 735 within the touchless food dispenser 710. For example, when the controller 804 controls the one or more nozzle replacement mechanisms 734 to remove the removable nozzle 730 from the aperture 729, the removable nozzle 730 can fall into, or otherwise be placed into, the disposal container 735.

In step 925, the method 900 includes inserting a different removable nozzle 730 into the touchless food dispenser 710. For example, the controller 804 can control the one or more nozzle replacement mechanisms 734 to insert a different removable nozzle 730 into the aperture 729 from the nozzle container 733. In some embodiments, the operator or the user can insert the different removable nozzle 730 in the aperture 729. In some embodiments, additional removable nozzles 730 can be stored within the touchless food dispenser 710 (e.g., in the one or more nozzle containers 733) such that the different removable nozzle 730 can automatically drop down into the aperture 729 to take the place of the removed removable nozzle 730, as detailed above. Thus, the touchless food dispenser 710 includes single-use removable nozzles 730 that can be removed and replaced after every use (e.g., every time food 758 is dispensed through, or into, a respective removable nozzle 730).

Figure 10:
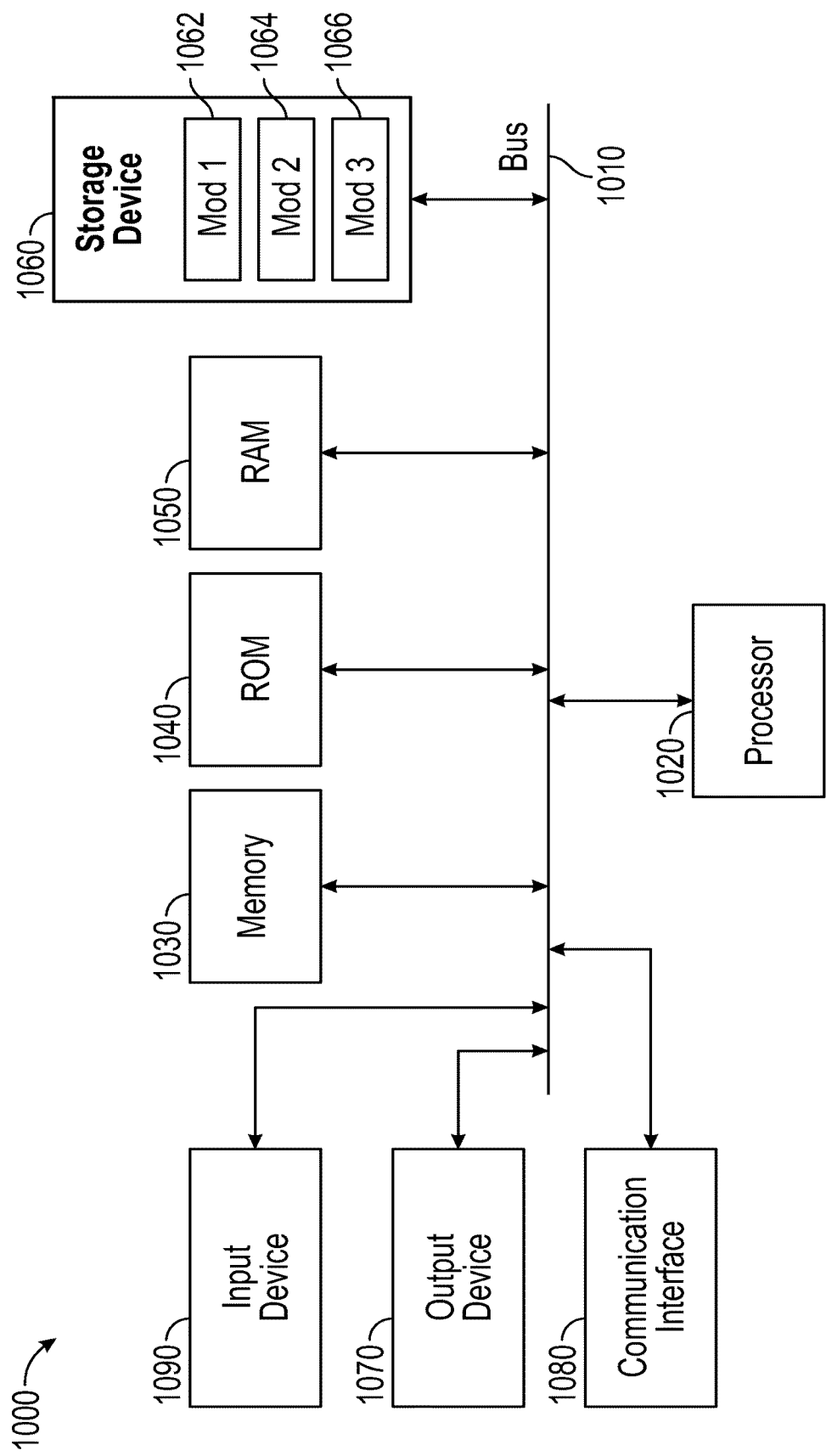
FIG. 10 illustrates a computer system, according to an embodiment of the present disclosure.

With reference to FIG. 10, an exemplary system includes a general-purpose computing device 1000, including a processing unit (CPU or processor) 1020 and a system bus 1010 that couples various system components including a memory 1030 such as read-only memory (ROM) 1040 and random-access memory (RAM) 1050 to the processor 1020. The computing device 1000 can include a cache of high-speed memory connected directly with, in close proximity to, or integrated as part of the processor 1020. The computing device 1000 copies data from the memory 1030 and/or the storage device 1060 to the cache for quick access by the processor 1020. In this way, the cache provides a performance boost that avoids processor 1020 delays while waiting for data. These and other modules can control or be configured to control the processor 1020 to perform various actions. Other memory 1030 may be available for use as well. The memory 1030 can include multiple different types of memory with different performance characteristics. It can be appreciated that the disclosure may operate on a computing device 1000 with more than one processor 1020 or on a group or cluster of computing devices networked together to provide greater processing capability. The processor 1020 can include any general-purpose processor and a hardware module or software module, such as module 1 1062, module 2 1064, and module 3 1066 stored in storage device 1060, configured to control the processor 1020 as well as a special-purpose processor where software instructions are incorporated into the actual processor design. The processor 1020 may essentially be a completely self-contained computing system, containing multiple cores or processors, a bus, memory controller, cache, etc. A multi-core processor may be symmetric or asymmetric.

The system bus 1010 may be any of several types of bus structures including a memory bus or memory controller, a peripheral bus, and a local bus using any of a variety of bus architectures. A basic input/output (BIOS) stored in ROM 1040 or the like, may provide the basic routine that helps to transfer information between elements within the computing device 1000, such as during start-up. The computing device 1000 further includes storage devices 1060 such as a hard disk drive, a magnetic disk drive, an optical disk drive, tape drive or the like. The storage device 1060 can include software modules 1062, 1064, 1066 for controlling the processor 1020. Other hardware or software modules are contemplated. The storage device 1060 is connected to the system bus 1010 by a drive interface. The drives and the associated computer-readable storage media provide non-volatile storage of computer-readable instructions, data structures, program modules and other data for the computing device 1000. In one aspect, a hardware module that performs a particular function includes the software component stored in a tangible computer-readable storage medium in connection with the necessary hardware components, such as the processor 1020, system bus 1010, output device 1070, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the computing device 1000 is a small, handheld computing device, a desktop computer, or a computer server.

Although the exemplary embodiment described herein employs the storage device 1060, other types of computer-readable media which can store data that are accessible by a computer, such as magnetic cassettes, flash memory cards, digital versatile disks, cartridges, random-access memories (RAMs) 1050, and read-only memory (ROM) 1040, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1000, an input device 1090 represents any number of input mechanisms, such as a microphone for speech, a touch-sensitive screen for gesture or graphical input, keyboard, mouse, motion input, speech and so forth. An output device 1070 can also be one or more of a number of output mechanisms known to those of skill in the art, such as, for example, a display. In some instances, multimodal systems enable a user to provide multiple types of input to communicate with the computing device 1000. The communications interface 1080 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Further aspects of the present disclosure are provided by the subject matter of the following clauses.

According to an aspect of the present disclosure, a touchless food includes one or more types of food stored therein and one or more dispensing mechanisms, wherein the food is caused to be dispensed through the one or more dispensing mechanisms without a user physically touching the touchless food dispenser.

The touchless food dispenser of the preceding clause, wherein the touchless food dispenser receives a selected amount of food to dispense and dispenses the selected amount of food.

The touchless food dispenser of any preceding clause, wherein the touchless food dispenser dispenses a predetermined amount of food.

The touchless food dispenser of any preceding clause, further comprising one or more user proximity sensors to detect a user in proximity of the touchless food dispenser.

The touchless food dispenser of any preceding clause, further comprising one or more dispenser proximity sensors to detect a gesture of the user that controls the food being dispensed through the one or more dispensing mechanisms.

The touchless food dispenser of any preceding clause, wherein the touchless food dispenser dispenses the food as long as the one or more dispenser proximity sensors detect the gesture of the user.

The touchless food dispenser of any preceding clause, further comprising a display for displaying pictures, video, or text with information of a selected type food for dispensing or an amount of food being dispensed.

The touchless food dispenser of any preceding clause, wherein the touchless food dispenser receives a selection of an amount of food to dispense from a computing device.

The touchless food dispenser of any preceding clause, wherein the one or more dispensing mechanisms include one or more apertures.

The touchless food dispenser of any preceding clause, wherein the food is stored in one or more packets within the touchless food dispenser, and the one or more packets are dispensed through the one or more apertures.

The touchless food dispenser of any preceding clause, wherein the one or more packets are bundled in a roll that is stored within the touchless food dispenser.

The touchless food dispenser of any preceding clause, further comprising a cutting mechanism that removes the one or more packets from the roll to dispense the one or more packets from the touchless food dispenser.

The touchless food dispenser of any preceding clause, wherein the cutting mechanism automatically opens the one or more packets as the one or more packets are being dispensed from the touchless food dispenser.

The touchless food dispenser of any preceding clause, wherein the touchless food dispenser receives a selected quantity of packets to dispense and dispenses the selected quantity of packets.

The touchless food dispenser of any preceding clause, further comprising one or more food storage containers, wherein the food is stored within the food storage containers.

The touchless food dispenser of any preceding clause, further comprising one or more pumps that pump the food from the one or more food storage containers to dispense the food.

The touchless food dispenser of any preceding clause, further comprising one or more removable nozzles.

The touchless food dispenser of any preceding clause, wherein the one or more removable nozzles are single-use removable nozzles that are removed and replaced with a different removable nozzle after each use of a respective removable nozzle.

The touchless food dispenser of any preceding clause, wherein the food is dispensed through the one or more removable nozzles.

The touchless food dispenser of any preceding clause, wherein the one or more removable nozzles are receptacles that receive the food therein.

The touchless food dispenser of any preceding clause, wherein the touchless food dispenser stores additional removable nozzles therein to replace the removed removable nozzle.

The touchless food dispenser of any preceding clause, further comprising a power supply that supplies power to the touchless food dispenser.

The touchless food dispenser of any preceding clause, further comprising a controller that controls the touchless food dispenser to dispense the food.

The touchless food dispenser of any preceding clause, further comprising a refrigeration device to control a temperature of the food within the touchless food dispenser.

According to an aspect of the present disclosure, a method of dispensing food from a touchless food dispenser includes receiving a selected type of food to dispense from a touchless food dispenser and dispensing the selected type of food through one or more dispensing mechanisms from the touchless food dispenser without a user physically touching the touchless food dispenser to cause the food to be dispensed.

The method of the preceding clause, further comprising receiving a selected amount of food to dispense and dispensing the selected amount of food.

The method of any preceding clause, further comprising dispensing a predetermined amount of food.

The method of any preceding clause, further comprising detecting the user is in proximity to the touchless food dispenser.

The method of any preceding clause, wherein receiving the selected type of food to dispense includes detecting a gesture of the user that controls the food being dispensed through the one or more dispensing mechanisms.

The method of any preceding clause, further comprising dispensing the food as long as the gesture of the user is detected.

The method of any preceding clause, further comprising displaying pictures, video, or text with information of a selected type food for dispensing or an amount of food being dispensed.

The method of any preceding clause, further comprising receiving, from a computing device, a selection of an amount of food to dispense.

The method of any preceding clause, wherein the one or more dispensing mechanisms include one or more apertures.

The method of any preceding clause, wherein the food is stored in packets within the touchless food dispenser, and the method further comprises dispensing the one or more packets through the one or more apertures.

The method of any preceding clause, wherein the one or more packets are bundled in a roll that is stored within the touchless food dispenser.

The method of any preceding clause, further comprising removing the one or more packets from the roll to dispense the one or more packets from the touchless food dispenser.

The method of any preceding clause, further comprising automatically opening the one or more packets as the one or more packets are being dispensed from the touchless food dispenser.

The method of any preceding clause, further comprising receiving a selected quantity of packets to dispense and dispensing the selected quantity of packets.

The method of any preceding clause, further comprising storing the food within one or more food storage containers.

The method of any preceding clause, further comprising pumping the food from the one or more food storage containers to dispense the food.

The method of any preceding clause, wherein the touchless food dispenser includes one or more removable nozzles.

The method of any preceding clause, further comprising removing and replacing a respective removable nozzle with a different removable nozzle after each use of the respective removable nozzle.

The method of any preceding clause, further comprising dispensing the food through the one or more removable nozzles.

The method of any preceding clause, wherein the one or more removable nozzles define a receptacle, and the method further comprises dispensing the food into the one or more removable nozzles.

The method of any preceding clause, further comprising storing additional removable nozzles within the touchless food dispenser to replace the removed removable nozzle.

The method of any preceding clause, further comprising supplying electric power to the touchless food dispenser through a power supply.

The method of any preceding clause, further comprising controlling the touchless food dispenser with a controller to dispense the food.

The method of any preceding clause, further comprising controlling a temperature of the food within the touchless food dispenser with a refrigeration device.

According to an aspect of the present disclosure, a touchless food dispenser includes one or more packets of food stored therein and one or more apertures, wherein the touchless food dispenser is configured to dispense the food through the one or more apertures.

The touchless food dispenser of any preceding clause, wherein the touchless food dispenser is configured to receive a selected amount of food to dispense and dispense the selected amount of food.

The touchless food dispenser of any preceding clause, wherein the touchless food dispenser is configured to dispense a predetermined amount of food.

The touchless food dispenser of any preceding clause, further comprising one or more dispenser proximity sensors that are configured to detect a gesture of the user that controls the food being dispensed through the one or more apertures.

The touchless food dispenser of any preceding clause, wherein the touchless food dispenser is configured to dispense the food as long as the one or more dispenser proximity sensors detect the gesture of the user.

The touchless food dispenser of any preceding clause, further comprising a display for displaying pictures, video, or text with information of a selected type food for dispensing or an amount of food being dispensed.

The touchless food dispenser of any preceding clause, wherein the touchless food dispenser is configured to receive a selection of an amount of food to dispense from a computing device.

The touchless food dispenser of any preceding clause, wherein the one or more packets are coupled together in a bundle and stored within the touchless food dispenser.

The touchless food dispenser of any preceding clause, further comprising a cutting mechanism that is configured to remove the one or more packets from the bundle to dispense the one or more packets from the touchless food dispenser.

The touchless food dispenser of any preceding clause, wherein the one or more packets are bundled together in a stack within the touchless food dispenser.

The touchless food dispenser of any preceding clause, wherein the one or more packets are bundled together in a roll within the touchless food dispenser.

The touchless food dispenser of any preceding clause, further comprising a cutting mechanism that is configured to remove the one or more packets from the roll to dispense the one or more packets from the touchless food dispenser.

The touchless food dispenser of any preceding clause, further comprising a cutting mechanism that is configured to automatically open the one or more packets as the one or more packets are being dispensed from the touchless food dispenser.

The touchless food dispenser of any preceding clause, wherein the touchless food dispenser is configured to receive a selected quantity of packets to dispense and dispenses the selected quantity of packets.

The touchless food dispenser of any preceding clause, wherein the one or more packets are coupled together and each packet includes one or more perforations.

The touchless food dispenser of any preceding clause, further comprises a packet sensor that is configured to detect the one or more packets as the one or more packets are being dispensed.

The touchless food dispenser of any preceding clause, further comprising one or more drive rollers, the touchless food dispenser configured to feed the one or more packets through the one or more drive rollers to dispense the one or more packets through the one or more apertures.

The touchless food dispenser of any preceding clause, the one or more drive rollers configured to force the food out of the one or more packets to dispense the food out of the one or more apertures and from the touchless food dispenser.

The touchless food dispenser of any preceding clause, further comprising an electric motor that is configured to provide mechanical power to the one or more drive rollers for rotating the one or more drive rollers.

The touchless food dispenser of any preceding clause, further comprising a power supply that is configured to supply power to the touchless food dispenser.

The touchless food dispenser of any preceding clause, further comprising a controller that is configured to control the touchless food dispenser to dispense the food.

The touchless food dispenser of any preceding clause, further comprising a refrigeration device that is configured to control a temperature of the food within the touchless food dispenser.

The touchless food dispenser of any preceding clause, wherein each of the one or more packets of food containing a single-serving of the food.

The touchless food dispenser of any preceding clause, wherein the one or more packets of food each contain less than 1 oz of food.

The touchless food dispenser of any preceding clause, wherein the one or more packets of food each contain less than 0.5 oz of food.

The touchless food dispenser of any preceding clause, wherein the touchless food dispenser is configured to dispense the food through the one or more apertures without a user physically touching the touchless food dispenser.

The touchless food dispenser of any preceding clause, further comprising a casing, wherein the one or more packets of food are stored within the casing, and the touchless food dispenser is configured to dispense the food out of the casing through the one or more apertures.

The touchless food dispenser of any preceding clause, further comprising one or more removable nozzles inserted in the one or more apertures, wherein the touchless food dispenser is configured to dispense the food from the touchless food dispenser through the one or more nozzles.

The touchless food dispenser of any preceding clause, wherein the touchless food dispenser is configured to dispense the one or more packets of food from the touchless food dispenser through the one or more apertures.

The touchless food dispenser of any preceding clause, wherein the one or more packets of food are stored within one or more food storage containers in the touchless food dispenser.

The touchless food dispenser of any preceding clause, further comprising a feed mechanism that is configured to release a packet of the one or more packets of food from the one or more food storage containers.

According to an aspect of the present disclosure, a method of dispensing food from a touchless food dispenser includes receiving a selected type of food to dispense from a touchless food dispenser, the touchless food dispenser storing one or more packets of food therein and dispensing the selected type of food through one or more apertures from the touchless food dispenser.

The method of any preceding clause, further comprising receiving a selected amount of food to dispense and dispensing the selected amount of food.

The method of any preceding clause, further comprising dispensing a predetermined amount of food.

The method of any preceding clause, further comprising detecting a gesture of the user that controls the food being dispensed through the one or more dispensing mechanisms.

The method of any preceding clause, further comprising dispensing the food as long as the gesture of the user is detected.

The method of any preceding clause, further comprising displaying pictures, video, or text with information of a selected type food for dispensing or an amount of food being dispensed.

The method of any preceding clause, further comprising receiving, from a computing device, a selection of an amount of food to dispense.

The method of any preceding clause, further comprising coupling the one or more packets together in a bundle and storing the coupled one or more packets within the touchless food dispenser.

The method of any preceding clause, further comprising removing the one or more packets from the bundle with a cutting mechanism to dispense the one or more packets from the touchless food dispenser.

The method of any preceding clause, further comprising storing the one or more packets in a stack within the touchless food dispenser.

The method of any preceding clause, further comprising storing the one or more packets in a roll within the touchless food dispenser.

The method of any preceding clause, further comprising removing the one or more packets from the roll to dispense the one or more packets from the touchless food dispenser.

The method of any preceding clause, further comprising automatically opening the one or more packets as the one or more packets are being dispensed from the touchless food dispenser.

The method of any preceding clause, further comprising receiving a selected quantity of packets to dispense and dispensing the selected quantity of packets.

The method of any preceding clause, further comprising detecting the one or more packets as the one or more packets are being dispensed.

The method of any preceding clause, further comprising feeding the one or more packets through one or more drive rollers to dispense the one or more packets through the one or more apertures.

The method of any preceding clause, further comprising forcing the food out of the one or more packets with the one or more drive rollers to dispense the food from the touchless food dispenser.

The method of any preceding clause, further comprising providing mechanical power to the one or more drive rollers to rotate the one or more drive rollers.

The method of any preceding clause, further comprising supplying power to the touchless food dispenser from a power supply.

The method of any preceding clause, further comprising controlling, by a controller, the touchless food dispenser to dispense the food.

The method of any preceding clause, further comprising controlling a temperature of the food within the touchless food dispenser with a refrigeration device.

The method of any preceding clause, wherein the one or more packets of food contain a single-serving of the food.

The method of any preceding clause, wherein the one or more packets of food each contain less than 1 oz of food.

The method of any preceding clause, wherein the one or more packets of food each contain less than 0.5 oz of food.

The method of any preceding clause, further comprising dispensing the food through the one or more apertures without a user physically touching the touchless food dispenser.

The method of any preceding clause, wherein the touchless food dispenser includes a casing, wherein the one or more packets of food are stored within the casing, and the method further comprises dispensing the food out of the casing through the one or more apertures.

The method of any preceding clause, wherein the touchless food dispenser includes one or more removable nozzles inserted in the one or more apertures, the method further comprising dispensing the food from the touchless food dispenser through the one or more nozzles.

The method of any preceding clause, further comprising dispensing the one or more packets of food from the touchless food dispenser through the one or more apertures.

The method of any preceding clause, wherein the one or more packets of food are stored within one or more food storage containers in the touchless food dispenser.

The method of any preceding clause, wherein the touchless food dispenser includes a feed mechanism, the method further comprising releasing a packet of the one or more packets of food from the one or more food storage containers.

According to an aspect of the present disclosure, a touchless food dispenser control system includes a touchless food dispenser comprising one or more packets of food stored therein and one or more apertures and a controller. The controller is configured to control the touchless food dispenser to dispense the food through the one or more apertures.

The touchless food dispenser control system of the preceding clause, wherein the controller is configured to receive a selected amount of food to dispense and to dispense the selected amount of food.

The touchless food dispenser control system of any preceding clause, wherein the controller is configured to control the touchless food dispenser to dispense a predetermined amount of food.

The touchless food dispenser control system of any preceding clause, further comprising one or more dispenser proximity sensors configured to detect a gesture of the user, wherein the controller is further configured to receive one or more dispenser proximity sensor signals from the one or more dispenser proximity sensors and control the touchless food dispenser to dispense the food through the one or more apertures when receiving the one or more dispenser proximity sensor signals.

The touchless food dispenser control system of any preceding clause, wherein the controller is further configured to control the touchless food dispenser to dispense the food as long as the one or more dispenser proximity sensors detect the gesture of the user.

The touchless food dispenser control system of any preceding clause, further comprising a display, wherein the controller is configured to display, on the display, pictures, video, or text with information of a selected type food for dispensing or an amount of food being dispensed.

The touchless food dispenser control system of any preceding clause, wherein the controller is configured to receive a selection of an amount of food to dispense from a computing device.

The touchless food dispenser control system of any preceding clause, wherein the one or more packets are coupled together in a bundle and stored within the touchless food dispenser.

The touchless food dispenser control system of any preceding clause, further comprising a cutting mechanism, the controller is further configured to control the cutting mechanism to remove the one or more packets from the bundle to dispense the one or more packets from the touchless food dispenser.

The touchless food dispenser control system of any preceding clause, wherein the one or more packets are bundled together in a stack within the touchless food dispenser.

The touchless food dispenser control system of any preceding clause, wherein the one or more packets are bundled in a roll that is stored within the touchless food dispenser.

The touchless food dispenser control system of any preceding clause, further comprising a cutting mechanism, wherein the controller is configured to control the cutting mechanism to remove the one or more packets from the roll to dispense the one or more packets from the touchless food dispenser.

The touchless food dispenser control system of any preceding clause, wherein the controller is configured to control the cutting mechanism to automatically open the one or more packets as the one or more packets are being dispensed from the touchless food dispenser.

The touchless food dispenser control system of any preceding clause, wherein the controller is configured to receive a selected quantity of packets to dispense and control the touchless food dispenser to dispense the selected quantity of packets.

The touchless food dispenser control system of any preceding clause, wherein the one or more packets are coupled together and each packet includes one or more perforations.

The touchless food dispenser control system of any preceding clause, further comprising a packet sensor that is configured to detect the one or more packets as the one or more packets are being dispensed, wherein the controller is configured to receive one or more packet signals from the packet sensor that indicates the detected one or more packets.

The touchless food dispenser control system of any preceding clause, further comprising one or more drive rollers, wherein the controller is configured to control the one or more drive rollers to feed the one or more packets through the one or more drive rollers to dispense the one or more packets through the one or more apertures.

The touchless food dispenser control system of any preceding clause, wherein the controller is configured to control the one or more drive rollers to force the food out of the one or more packets to dispense the food out of the one or more apertures and from the touchless food dispenser.

The touchless food dispenser control system of any preceding clause, further comprising an electric motor that is configured to provide mechanical power to the one or more drive rollers for rotating the one or more drive rollers, wherein the controller is configured to control the electric motor to rotate the one or more drive rollers.

The touchless food dispenser control system of any preceding clause, further comprising a power supply, wherein the controller is configured to supply power from the power supply to the touchless food dispenser.

The touchless food dispenser control system of any preceding clause, further comprising a refrigeration device, wherein the controller is configured to control a temperature of the food within the touchless food dispenser with the refrigeration device.

The touchless food dispenser control system of any preceding clause, wherein each of the one or more packets of food contain a single-serving of the food.

The touchless food dispenser control system of any preceding clause, wherein the one or more packets of food each contain less than 1 oz of food.

The touchless food dispenser control system of any preceding clause, wherein the one or more packets of food each contain less than 0.5 oz of food.

The touchless food dispenser control system of any preceding clause, wherein the controller controls the touchless food dispenser to dispense the food through the one or more apertures without a user physically touching the touchless food dispenser.

The touchless food dispenser control system of any preceding clause, wherein the touchless food dispenser includes a casing, wherein the one or more packets of food are stored within the casing, and the controller controls the touchless food dispenser to dispense the food out of the casing through the one or more apertures.

The touchless food dispenser control system of any preceding clause, wherein the touchless food dispenser includes one or more removable nozzles inserted in the one or more apertures, and the controller further controls the touchless food dispenser to dispense the food from the touchless food dispenser through the one or more nozzles.

The touchless food dispenser control system of any preceding clause, wherein the controller controls the touchless food dispenser to dispense the one or more packets of food from the touchless food dispenser through the one or more apertures.

The touchless food dispenser control system of any preceding clause, wherein the one or more packets of food are stored within one or more food storage containers in the touchless food dispenser.

The touchless food dispenser control system of any preceding clause, wherein the touchless food dispenser includes a feed mechanism, and the controller controls the feed mechanism to release a packet of the one or more packets of food from the one or more food storage containers.

According to an aspect of the present disclosure, a touchless food dispenser includes one or more types of food stored therein and one or more removable nozzles, wherein the touchless food dispenser is configured to dispense the food through the one or more removable nozzles, and one or more nozzle replacement mechanisms that are configured to remove the one or more removable nozzles and replace the one or more removable nozzles with a different removable nozzle.

The touchless food dispenser of any preceding clause, wherein the touchless food dispenser is configured to receive a selected amount of food to dispense and dispense the selected amount of food.

The touchless food dispenser of any preceding clause, wherein the touchless food dispenser is configured to dispense a predetermined amount of food.

The touchless food dispenser of any preceding clause, further comprising one or more dispenser proximity sensors that are configured to detect a gesture of the user that controls the food being dispensed through the one or more removable nozzles.

The touchless food dispenser of any preceding clause, wherein the touchless food dispenser that is configured to dispense the food as long as the one or more dispenser proximity sensors detect the gesture of the user.

The touchless food dispenser of any preceding clause, further comprising a display for displaying pictures, video, or text with information of a selected type food for dispensing or an amount of food being dispensed.

The touchless food dispenser of any preceding clause, wherein the touchless food dispenser is configured to receive a selection of an amount of food to dispense from a computing device.

The touchless food dispenser of any preceding clause, further comprising one or more food storage containers, wherein the food is stored within the food storage containers.

The touchless food dispenser of any preceding clause, further comprising one or more pumps that are configured to pump the food from the one or more food storage containers to dispense the food.

The touchless food dispenser of any preceding clause, wherein the one or more removable nozzles are single-use removable nozzles, and the one or more nozzle replacement mechanisms are configured to remove and replace the single-use removable nozzles with a different single-use removable nozzle after each use of a respective single-use removable nozzle.

The touchless food dispenser of any preceding clause, wherein the one or more removable nozzles are receptacles that receive the food therein.

The touchless food dispenser of any preceding clause, wherein the touchless food dispenser stores additional removable nozzles therein to replace the removed removable nozzle.

The touchless food dispenser of any preceding clause, wherein the additional removable nozzles are stored in one or more nozzle containers.

The touchless food dispenser of any preceding clause, further comprising a disposal container, wherein the one or more nozzle replacement mechanisms are configured to remove the one or more removable nozzles into the disposal container.

The touchless food dispenser of any preceding clause, wherein the one or more removable nozzles are secured in one or more apertures within the touchless food dispenser.

The touchless food dispenser of any preceding clause, further comprising one or more clasps, wherein the one or more removable nozzles are secured to the touchless food dispenser by the one or more clasps.

The touchless food dispenser of any preceding clause, wherein the one or more removable nozzles are secured to the touchless food dispenser by a threaded connection The touchless food dispenser of any preceding clause, further comprising a power supply that is configured to supply power to the touchless food dispenser.

The touchless food dispenser of any preceding clause, further comprising a controller that is configured to control the touchless food dispenser to dispense the food.

The touchless food dispenser of any preceding clause, further comprising a refrigeration device that is configured to control a temperature of the food within the touchless food dispenser.

The touchless food dispenser of any preceding clause, wherein the touchless food dispenser is configured to dispense the food through the one or more removable nozzles without a user physically touching the touchless food dispenser.

The touchless food dispenser of any preceding clause, further comprising a casing, wherein the one or more types of food are stored within the casing, and the touchless food dispenser is configured to dispense the food out of the casing through the one or more removable nozzles.

The touchless food dispenser of any preceding clause, further comprising one or more packets that contain the one or more types of food therein.

The touchless food dispenser of any preceding clause, wherein the touchless food dispenser includes a first state in which a removable nozzle of the one or more removable nozzles is configured to dispense the one or more types of food therethrough, and a second state in which the different removable nozzle is configured to dispense the one or more types of food therethrough.

The touchless food dispenser of any preceding clause, wherein the one or more types of food are stored in one or more food-containing bags within the touchless food dispenser.

The touchless food dispenser of any preceding clause, wherein the one or more food-containing bags are stored within one or more food storage containers.

The touchless food dispenser of any preceding clause, further comprising a dispensing area, wherein the one or more removable nozzles are oriented to dispense the food into the dispensing area.

The touchless food dispenser of any preceding clause, further comprising one or more user proximity sensors that are configured to detect a user in proximity to the touchless food dispenser.

The touchless food dispenser of any preceding clause, further comprising one or more stacks of additional removable nozzles stored within the touchless food dispenser.

The touchless food dispenser of any preceding clause, further comprising one or more tubes that are configured to provide the one or more types of food to the one or more removable nozzles to dispense the food through the one or more removable nozzles.

According to an aspect of the present disclosure, a method of dispensing food from a touchless food dispenser includes receiving a selected type of food to dispense from a touchless food dispenser, the touchless food dispenser storing one or more types of food therein, dispensing the selected type of food through one or more removable nozzles from the touchless food dispenser with, and removing, with one or more nozzle replacement mechanisms, the one or more removable nozzles and replacing, with the one or more nozzle replacement mechanisms, the one or more removable nozzles with a different removable nozzle.

The method of any preceding clause, further comprising receiving a selected amount of food to dispense and dispensing the selected amount of food.

The method of any preceding clause, further comprising dispensing a predetermined amount of food.

The method of any preceding clause, further comprising detecting a gesture of the user that controls the food being dispensed through the one or more dispensing mechanisms.

The method of any preceding clause, further comprising dispensing the food as long as the gesture of the user is detected.

The method of any preceding clause, further comprising displaying pictures, video, or text with information of a selected type food for dispensing or an amount of food being dispensed.

The method of any preceding clause, further comprising receiving, from a computing device, a selection of an amount of food to dispense.

The method of any preceding clause, further comprising storing the food within one or more food storage containers.

The method of any preceding clause, further comprising pumping the food from the one or more food storage containers to dispense the food.

The method of any preceding clause, further comprising removing and replacing, with the one or more nozzle replacement mechanisms, a respective removable nozzle with a different removable nozzle after each use of the respective removable nozzle.

The method of any preceding clause, further comprising storing the additional removable nozzles in one or more nozzle containers.

The method of any preceding clause, further comprising a disposal container, the method further comprising removing, with the one or more nozzle replacement mechanisms, the one or more removable nozzles into the disposal container.

The method of any preceding clause, wherein the one or more removable nozzles are secured in one or more apertures within the touchless food dispenser.

The method of any preceding clause, wherein the one or more removable nozzles are secured to the touchless food dispenser by one or more clasps.

The method of any preceding clause, wherein the one or more removable nozzles are secured to the touchless food dispenser by a threaded connection The method of any preceding clause, wherein the one or more removable nozzles define receptacles that receive the food therein.

The method of any preceding clause, further comprising storing additional removable nozzles within the touchless food dispenser to replace the removed removable nozzle.

The method of any preceding clause, further comprising supplying power to the touchless food dispenser from a power supply.

The method of any preceding clause, further comprising controlling, by a controller, the touchless food dispenser to dispense the food.

The method of any preceding clause, further comprising controlling a temperature of the food within the touchless food dispenser with a refrigeration device.

The method of any preceding clause, further comprising dispensing the food through the one or more removable nozzles without a user physically touching the touchless food dispenser.

The method of any preceding clause, wherein the touchless food dispenser includes a casing, wherein the one or more types of food are stored within the casing, and the method further comprises dispensing the food out of the casing through the one or more removable nozzles.

The method of any preceding clause, wherein the touchless food dispenser includes one or more packets that contain the one or more types of food therein.

The method of any preceding clause, wherein the touchless food dispenser includes a first state in which a removable nozzle of the one or more removable nozzles is configured to dispense the one or more types of food therethrough, and a second state in which the different removable nozzle is configured to dispense the one or more types of food therethrough.

The method of any preceding clause, wherein the one or more types of food are stored in one or more food-containing bags within the touchless food dispenser.

The method of any preceding clause, wherein the one or more food-containing bags are stored within one or more food storage containers.

The method of any preceding clause, wherein the touchless food dispenser includes a dispensing area, wherein the one or more removable nozzles are oriented to dispense the food into the dispensing area.

The method of any preceding clause, wherein the touchless food dispenser includes one or more user proximity sensors that are configured to detect a user in proximity to the touchless food dispenser.

The method of any preceding clause, wherein the touchless food dispenser includes one or more stacks of additional removable nozzles stored within the touchless food dispenser.

The method of any preceding clause, wherein the touchless food dispenser includes one or more tubes that are configured to provide the one or more types of food to the one or more removable nozzles to dispense the food through the one or more removable nozzles.

According to an aspect of the present disclosure, a touchless food dispenser control system includes a touchless food dispenser comprising one or more types of food stored therein and one or more removable nozzles and a controller configured to control the touchless food dispenser to dispense the food through the one or more removable nozzles, and to remove, with one or more nozzle replacement mechanisms, the one or more removable nozzles and replace, with the one or more nozzle replacement mechanisms, the one or more removable nozzles with a different removable nozzle.

The touchless food dispenser control system of any preceding clause, wherein the controller is configured to receive a selected amount of food to dispense and to control the touchless food dispenser to dispense the selected amount of food.

The touchless food dispenser control system of any preceding clause, wherein the controller is configured to control the touchless food dispenser to dispense a predetermined amount of food.

The touchless food dispenser control system of any preceding clause, further comprising one or more dispenser proximity sensors that are configured to detect a gesture of the user, wherein the controller is further configured to receive one or more dispenser proximity sensor signals from the one or more dispenser proximity sensors and control the food being dispensed through the one or more removable nozzles when receiving the one or more dispenser proximity sensor signals.

The touchless food dispenser control system of any preceding clause, wherein the controller is further configured to control the touchless food dispenser to dispense the food as long as the one or more dispenser proximity sensors detect the gesture of the user.

The touchless food dispenser control system of any preceding clause, further comprising a display, wherein the controller is configured to display, on the display, pictures, video, or text with information of a selected type food for dispensing or an amount of food being dispensed.

The touchless food dispenser control system of any preceding clause, wherein the controller is configured to receive a selection of an amount of food to dispense from a computing device.

The touchless food dispenser control system of any preceding clause, further comprising one or more food storage containers, wherein the food is stored within the food storage containers.

The touchless food dispenser control system of any preceding clause, further comprising one or more pumps, wherein the controller is configured to control the one or more pumps to pump the food from the one or more food storage containers to dispense the food.

The touchless food dispenser control system of any preceding clause, wherein the one or more removable nozzles are single-use removable nozzles, and the controller is configured to control the one or nozzle replacement mechanisms remove and replace the single-use removable nozzles with a new single-use removable nozzle after each use of a respective single-use removable nozzle.

The touchless food dispenser control system of any preceding clause, wherein the one or more removable nozzles define receptacles, wherein the controller is configured to control the touchless food dispenser to dispense the food into the one or more removable nozzles.

The touchless food dispenser control system of any preceding clause, wherein the touchless food dispenser stores additional removable nozzles therein, wherein the controller is configured to control the touchless food dispenser to replace the removed removable nozzle with an additional removable nozzle.

The touchless food dispenser control system of any preceding clause, wherein the additional removable nozzles are stored in one or more nozzle containers.

The touchless food dispenser control system of any preceding clause, further comprising a disposal container, wherein the controller controls the one or more nozzle replacement mechanisms to remove the one or more removable nozzles into the disposal container.

The touchless food dispenser control system of any preceding clause, wherein the one or more removable nozzles are secured in one or more apertures within the touchless food dispenser.

The touchless food dispenser control system of any preceding clause, wherein the one or more removable nozzles are secured to the touchless food dispenser by one or more clasps.

The touchless food dispenser control system of any preceding clause, wherein the one or more removable nozzles are secured to the touchless food dispenser by a threaded connection The touchless food dispenser control system of any preceding clause, further comprising a power supply that is configured to supply power from the power supply to the touchless food dispenser.

The touchless food dispenser control system of any preceding clause, further comprising a refrigeration device, wherein the controller is configured to control a temperature of the food within the touchless food dispenser with the refrigeration device.

The touchless food dispenser control system of any preceding clause, wherein the controller controls the touchless food dispenser to dispense the food through the one or more removable nozzles without a user physically touching the touchless food dispenser.

The touchless food dispenser control system of any preceding clause, wherein the touchless food dispenser includes a casing, wherein the one or more types of food are stored within the casing, and the controller controls the touchless food dispenser to dispense the food out of the casing through the one or more removable nozzles.

The touchless food dispenser control system of any preceding clause, wherein the touchless food dispenser includes one or more packets that contain the one or more types of food therein.

The touchless food dispenser control system of any preceding clause, wherein the touchless food dispenser includes a first state in which a removable nozzle of the one or more removable nozzles is configured to dispense the one or more types of food therethrough, and a second state in which the different removable nozzle is configured to dispense the one or more types of food therethrough.

The touchless food dispenser control system of any preceding clause, wherein the one or more types of food are stored in one or more food-containing bags within the touchless food dispenser.

The touchless food dispenser control system of any preceding clause, wherein the one or more food-containing bags are stored within one or more food storage containers.

The touchless food dispenser control system of any preceding clause, wherein the touchless food dispenser includes a dispensing area, wherein the one or more removable nozzles are oriented to dispense the food into the dispensing area.

The touchless food dispenser control system of any preceding clause, wherein the touchless food dispenser includes one or more user proximity sensors that are configured to detect a user in proximity to the touchless food dispenser.

The touchless food dispenser control system of any preceding clause, wherein the touchless food dispenser includes one or more stacks of additional removable nozzles stored within the touchless food dispenser.

The touchless food dispenser control system of any preceding clause, wherein the touchless food dispenser includes one or more tubes that are configured to provide the one or more types of food to the one or more removable nozzles to dispense the food through the one or more removable nozzles.

Although the foregoing description is directed to the preferred embodiments, it is noted that other variations and modifications will be apparent to those skilled in the art and may be made without departing from the spirit or scope of the disclosure. Moreover, features described in connection with one embodiment may be used in conjunction with other embodiments, even if not explicitly stated above.

The invention claimed is:

1. A touchless food dispenser comprising:
 a plurality of packets of food stored within the touchless food dispenser;
 one or more apertures oriented to direct at least one of the plurality of packets of food out of the touchless food dispenser;
 a packet sensor that is configured to detect the plurality of packets of food as the plurality of packets of food are being dispensed;
 a powered roller assembly including a plurality of drive rollers configured to feed the plurality of packets of food continuously one after another toward the one or more apertures and to squeeze the plurality of packets of food between the plurality of drive rollers as the plurality of drive rollers feed the plurality of packets of food toward the one or more apertures; and a controller configured to:
control the plurality of drive rollers to feed the plurality of packets of food from inside the touchless food dispenser continuously one after another toward the one or more apertures such that the at least one of the plurality of packets of food is dispensed through the one or more apertures and out of the touchless food dispenser, and the plurality of drive rollers squeeze the at least one of the plurality of packets of food as the plurality of drive rollers feed the plurality of packets of food toward the one or more apertures;
detect the plurality of packets of food being fed through the plurality of drive rollers;
determine whether a selected amount of the food has been dispensed out of the touchless food dispenser based on the plurality of packets of food detected by the packet sensor; and
stop dispensing the plurality of packets of food out of the touchless food dispenser when the selected amount of food has been dispensed.

2. The touchless food dispenser of claim 1, wherein the controller is configured to determine a number of the plurality of packets of food that are being fed towards the one or more apertures for determining the selected amount of the food that has been dispensed.

3. The touchless food dispenser of claim 1, wherein the controller is configured to determine perforations in the plurality of packets of food as the plurality of packets of food pass the packet sensor.

4. The touchless food dispenser of claim 1, wherein the packet sensor is a photo-electronic device for detecting the plurality of packets of food.

5. The touchless food dispenser of claim 1, wherein the controller is configured to receive the selected amount of food to dispense and control the touchless food dispenser to dispense the selected amount of food.

6. The touchless food dispenser of claim 1, wherein the controller is configured to control the touchless food dispenser to dispense a predetermined amount of food.

7. The touchless food dispenser of claim 1, further comprising one or more dispenser proximity sensors to detect a gesture of a user, and the controller is configured to control the food being dispensed through the one or more apertures based on the gesture of the user.

8. The touchless food dispenser of claim 7, wherein the controller controls the touchless food dispenser to dispense the food as long as the one or more dispenser proximity sensors detect the gesture of the user.

9. The touchless food dispenser of claim 1, wherein the controller receives a selection of an amount of food to dispense from a computing device.

10. The touchless food dispenser of claim 1, wherein the controller is configured to receive a selected quantity of the plurality of packets of food to dispense and control the touchless food dispenser to dispense the selected quantity of the plurality of packets of food.

11. The touchless food dispenser of claim 1, wherein the plurality of drive rollers are configured to force the food out of the plurality of packets of food to dispense the food out of the one or more apertures and from the touchless food dispenser.

12. The touchless food dispenser of claim 1, further comprising an electric motor that is configured to provide mechanical power to the plurality of drive rollers for rotating the plurality of drive rollers.

13. The touchless food dispenser of claim 1, further comprising a cutting mechanism, wherein the controller is configured to control the cutting mechanism to cut the plurality of packets of food to dispense the at least one of the plurality of packets of food from the touchless food dispenser.

14. A method of dispensing food from a touchless food dispenser including plurality of packets of food stored within the touchless food dispenser, one or more apertures, a packet sensor, and a powered roller assembly including plurality of drive rollers, the method comprising:
dispensing at least one of the plurality of packets of food out of the touchless food dispenser by feeding the plurality of packets of food continuously one after another toward the one or more apertures and squeezing the at least one of the plurality of packets of food with the plurality of drive rollers as the plurality of drive rollers feed the plurality of packets of food toward the one or more apertures;
detecting the plurality of packets of food being fed through the plurality of drive rollers;
determine whether a selected amount of the food has been dispensed out of the touchless food dispenser based on the plurality of packets of food detected by the packet sensor; and
stop dispensing the plurality of packets of food out of the touchless food dispenser when the selected amount of food has been dispensed.

15. The method of claim 14, further comprising determining a number of the plurality of packets of food that are being fed towards the one or more apertures for determining the selected amount of the food that has been dispensed.

16. The method of claim 14, further comprising determining perforations in the plurality of packets of food as the plurality of packets of food pass the packet sensor.

17. The method of claim 14, wherein the packet sensor is a photo-electronic device for detecting the plurality of packets of food.

18. The method of claim 14, further comprising receiving the selected amount of food to dispense and control the touchless food dispenser to dispense the selected amount of food.

19. The method of claim 14, further comprising dispensing a predetermined amount of food.

20. The method of claim 14, further comprising detecting a gesture of a user by one or more dispenser proximity sensors, and dispensing the food through the one or more apertures based on the gesture of the user.

21. The method of claim 14, further comprising receiving, at the touchless food dispenser, the selected amount of food to dispense from a computing device.

22. The method of claim 14, further comprising forcing the food out of the plurality of packets of food with the plurality of drive rollers to dispense the food out of the one or more apertures and from the touchless food dispenser.

23. The method of claim 14, providing mechanical power to the plurality of drive rollers with an electric motor for rotating the plurality of drive rollers.

24. The method of claim 14, further comprising cutting the plurality of packets of food with a cutting mechanism to dispense the at least one of the plurality of packets of food from the touchless food dispenser.

\* \* \* \* \*